(12) United States Patent
Mao et al.

(10) Patent No.: US 9,818,225 B2
(45) Date of Patent: Nov. 14, 2017

(54) SYNCHRONIZING MULTIPLE HEAD-MOUNTED DISPLAYS TO A UNIFIED SPACE AND CORRELATING MOVEMENT OF OBJECTS IN THE UNIFIED SPACE

(71) Applicant: Sony Interactive Entertainment Inc., Tokyo OT (JP)

(72) Inventors: Xiaodong Mao, San Mateo, CA (US); Brian Watson, Burlingame, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/866,700

(22) Filed: Sep. 25, 2015

(65) Prior Publication Data
US 2016/0093108 A1 Mar. 31, 2016

Related U.S. Application Data

(60) Provisional application No. 62/058,066, filed on Sep. 30, 2014.

(51) Int. Cl.
*G09G 5/00* (2006.01)
*G06T 19/00* (2011.01)
*G02B 27/01* (2006.01)
*G06T 1/20* (2006.01)
*G06F 3/01* (2006.01)
(Continued)

(52) U.S. Cl.
CPC .......... *G06T 19/006* (2013.01); *A63F 13/213* (2014.09); *A63F 13/26* (2014.09); *A63F 13/30* (2014.09); *A63F 13/35* (2014.09); *A63F 13/42* (2014.09); *A63F 13/493* (2014.09); *A63F 13/795* (2014.09); *A63F 13/825* (2014.09); *G02B 27/017* (2013.01); *G06F 3/011* (2013.01); *G06F 3/012* (2013.01); *G06T 1/20* (2013.01); *G06T 19/003* (2013.01)

(58) Field of Classification Search
None
See application file for complete search history.

(56) References Cited

U.S. PATENT DOCUMENTS 8,167,724 B2 * 5/2012 Shuster ................ G06Q 10/00
463/29
2004/0051745 A1 * 3/2004 Gargi ..................... G06T 19/00
715/850

(Continued)

OTHER PUBLICATIONS

ISR PCT/US2015/052733, dated Dec. 9, 2015, 5 pages.

*Primary Examiner* — Xiao Wu
*Assistant Examiner* — Mohammad H Akhavannik
(74) *Attorney, Agent, or Firm* — Martine Penilla Group, LLP

(57) ABSTRACT

A method for sharing content with other HMDs includes rendering content of a virtual environment scene on a display screen of a head-mounted display associated with a first user. The display screen rendering the virtual environment scene represents a virtual reality space of the first user. A request to share the virtual reality space of the first user is detected. The request targets a second user. In response to detecting acceptance of the request to share, the virtual reality space of the first user is shared with the second user. The sharing allows synchronizing the virtual environment scene rendered on the head mounted display of the first and the second users.

31 Claims, 16 Drawing Sheets

(51) Int. Cl.
  *A63F 13/825*  (2014.01)
  *A63F 13/493*  (2014.01)
  *A63F 13/795*  (2014.01)
  *A63F 13/30*   (2014.01)
  *A63F 13/26*   (2014.01)
  *A63F 13/35*   (2014.01)
  *A63F 13/213*  (2014.01)
  *A63F 13/42*   (2014.01)

(56) References Cited

U.S. PATENT DOCUMENTS

| | | |
|---|---|---|
| 2012/0249416 A1 | 10/2012 | Maciocci et al. |
| 2013/0342564 A1 | 12/2013 | Kinnebrew et al. |
| 2014/0125698 A1 | 5/2014 | Latta et al. |
| 2014/0184496 A1 | 7/2014 | Gribetz et al. |

* cited by examiner

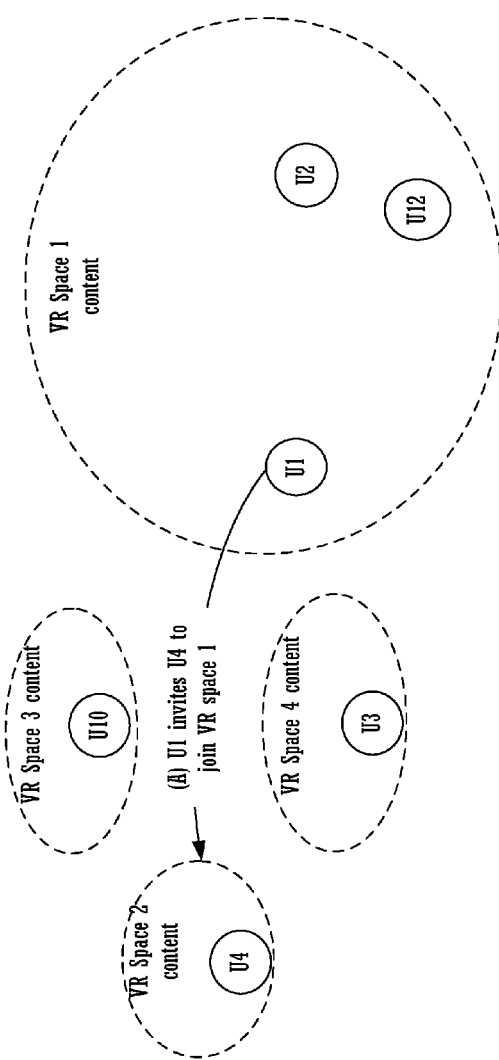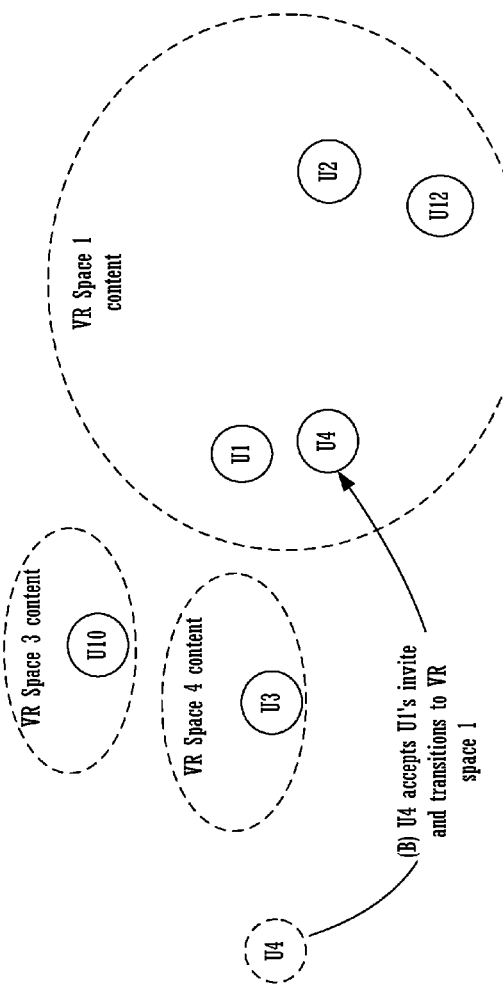

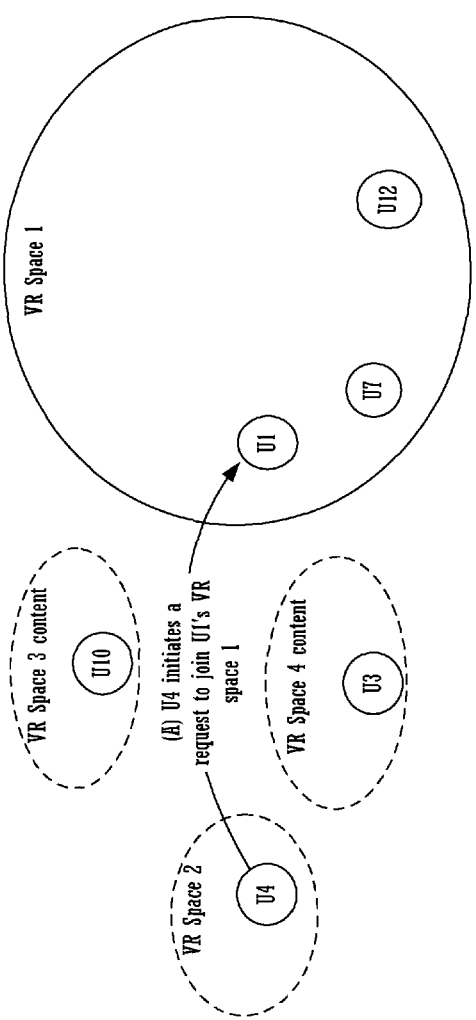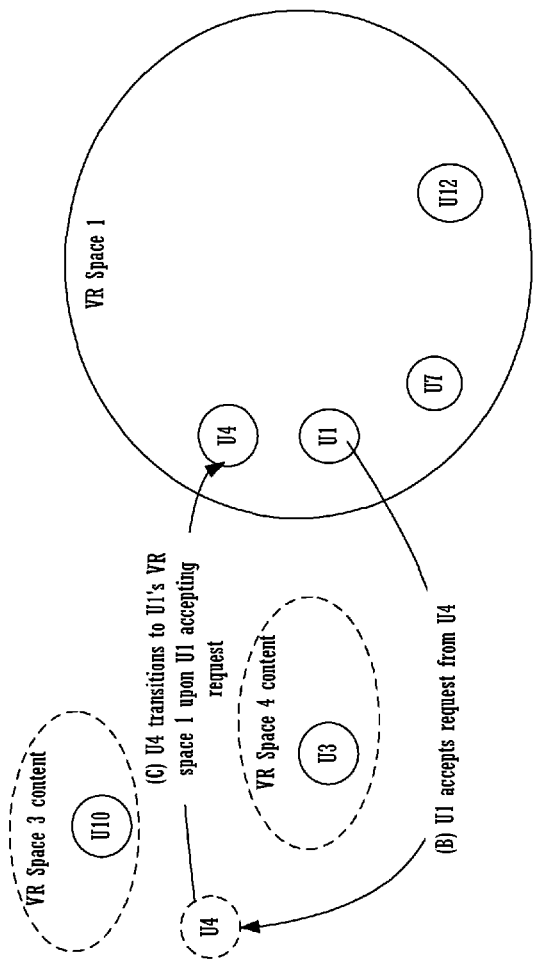

SYNCHRONIZING MULTIPLE HEAD-MOUNTED DISPLAYS TO A UNIFIED SPACE AND CORRELATING MOVEMENT OF OBJECTS IN THE UNIFIED SPACE

CLAIM OF PRIORITY

This application claims priority under 35 U.S.C. §119 to U.S. Provisional Patent Application No. 62/058,066, filed on Sep. 30, 2014, and entitled "SYNCHRONIZING MULTIPLE HEAD-MOUNTED DISPLAYS TO A UNIFIED SPACE AND CORRELATING MOVEMENT OF OBJECTS IN THE UNIFIED SPACE", the disclosure for which is incorporated herein by reference.

BACKGROUND

1. Field of the Invention

The present invention relates to methods and systems for synchronizing multiple head-mounted displays.

2. Description of the Related Art

The video game industry has seen many changes over the years. As computing power has expanded, developers of video games have likewise created game software that takes advantage of these increases in computing power. To this end, video game developers have been coding games and developing gaming platforms that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game developers and hardware manufacturers have continued to innovate to enable additional interactivity.

A growing trend in the computer gaming industry is to develop games that increase the interaction between the user and the gaming system. One way of accomplishing a richer interactive experience is to use wireless game controllers whose movement is tracked by the gaming system in order to track the player's movements and gestures, and use these movements and gestures as inputs for the game. Generally speaking, gesture input is used by an electronic device such as a computing system, video game console, smart appliance, etc., executing a game application act to some gesture made by the player and captured by the electronic device to affect an outcome of a game.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes an application, such as a game application, and communicates with a local thin client that can be configured to receive input from users and render video on a display.

It is in this context that embodiments of the invention arise.

SUMMARY

Embodiments of the present invention provide methods and systems for utilizing multiple head mounted displays (HMDs) to render content in a virtual reality space. The content is shared and synchronized across multiple HMDs. Users are allowed to interact with the content using real-world objects and user interactions are used as input to an application providing the content for the HMD. In some embodiments, the real-world objects are synchronized to the virtual world rendered in the virtual reality space. In such embodiments, inputs to the application are converted into actions in the virtual world. The actions are used to affect an outcome of the application resulting in changes to the content that is being rendered at the HMDs.

It should be appreciated that the present invention can be implemented in numerous ways, such as a process, an apparatus, a system, a device or a method on a computer readable medium. Several inventive embodiments of the present invention are described below.

In one embodiment, a method is disclosed. The method includes providing content of a virtual environment scene for rendering on a display screen of a head-mounted display associated with a first user. The content is provided in response to detecting a request for the content initiated by the first user. The display screen rendering the virtual environment scene represents a virtual reality space of the first user. A request to share the virtual reality space of the first user is detected. The request targets a second user. In response to detecting a signal accepting the request to share, the virtual reality space of the first user is shared with the second user. The sharing includes providing the content for rendering in a second virtual reality space defined on the head mounted display associated with the second user and allows synchronizing, in substantial real time, the content rendering in the virtual reality space and the second virtual reality space defined in the display screen of the head mounted display associated with the first and the second users.

In one embodiment, the request to share is initiated by the first user and extended to the second user.

In one embodiment, the request to share is initiated by the second user to the first user.

In one embodiment, the first user is identified from social contacts of the second user.

In one embodiment, the second user is a social contact of the first user and in some embodiments, is in a vicinity of the first user.

In one embodiment, the sharing allows the first user and the second user to access the content rendered in the head mounted displays of the first and the second users. The access allows the first and the second users to interact with the application providing the content for the virtual environment scene. The interaction is used as input to the application, and the virtual environment scene presented at the head mounted display of the first and the second users are dynamically adjusted, in substantial real time to reflect an outcome of the application, based on the interaction.

In one embodiment, the sharing includes identifying one or more real world objects from a real world scene within a vicinity of the first user and the second user; coordinating positions of the real world objects to specific objects or positions in the virtual environment scene; and translating actions taken related to the real world objects in the real world scene into actions to be taken by the application in the virtual environment scene. The actions taken used to dynamically adjust and synchronize content with the virtual environment scene presented on the head mounted display of the first and the second users.

In one embodiment, coordinating positions includes tracking the position of the real world objects in the real world scene using one or more cameras and synchronizing the positions of the real world objects with the specific objects or positions in the virtual environment scene.

In one embodiment, sharing includes presenting user-related information associated with the second user within the virtual reality space of the first user and the user-related information associated with the first user within the virtual reality space of the second user.

In one embodiment, presenting the user-related information includes bringing the user-related information of the first and the second users gradually into focus within the respective virtual reality spaces.

In one embodiment, sharing includes generating a signal to pause an activity that the second user was involved in prior to detection of the signal granting the request to share, wherein the activity was used to affect second content being rendered at the head mounted display of the second user and presenting the content from the virtual environment scene of the first user. The second content being different from the content rendered at the head mounted display of the first user.

In one embodiment, a request to leave the virtual reality space of the first user is detected, wherein the request to leave is initiated by the second user. In response to detecting the request to leave, the content from the virtual reality space of the first user is ceased from rendering on the head mounted display of the second user and the activity that the second user was involved in prior to accepting the request to join, is resumed from a point where it was paused. The resumption of the activity causes rendering of the second content on the display screen of the head mounted display of the second user.

In one embodiment, the request to leave includes removing user-related information of the second user from the virtual reality space of the first user. The removal is by gradually fading out the user-related information of the second user from the virtual reality space of the first user.

In one embodiment, a request to leave the virtual reality space is detected. The request is initiated by the first user. In response to detecting the request to leave, the content rendered in the virtual reality space of the first user and the second user is ceased.

In one embodiment, the ceasing includes providing a portion of the application to the second user to allow the second user to continue interaction with the application. The portion of the application provides content for rendering on the head mounted display of the second user and is one of an abridged version, a portion that is less than a whole application or the application with less features.

In one embodiment, a method is disclosed. The method includes receiving a request for a virtual tour of a geo location, from a first user. In response to the request, video content associated with the virtual tour is returned for presenting in virtual reality space defined on a display screen of a head mounted display associated with the first user. The video content is presented in three dimensional space. An invitation to join in the virtual tour of the geo location is detected. The invitation is extended by the first user to the second user. Upon the second user accepting the invitation, the video content from the virtual reality space of the first user is provided to the second user. The acceptance to join causes the video content associated with the virtual tour of the geo location to be rendered on the display screen of the head mounted display of the second user.

In one embodiment, the video content presented in the virtual reality space includes one or more user-related information of other users taking the virtual tour of the geo location at a time the request was received.

In one embodiment, social contacts of the first user are retrieved by querying one or more social network of the first user and presented on the display screen for selection. Selection of the second user from the social contacts of the first user is detected, wherein the second user is different from the other users whose user-related information is rendered in the virtual reality space. The selected second user is extended the invitation to join the virtual tour of the geo location.

In one embodiment, the video content presented during the virtual tour includes content pre-recorded by the first user or one of other users and made available for sharing.

In one embodiment, sharing the virtual reality space includes generating a signal to pause an activity that the second user is involved in prior to accepting the invitation to join, identifying a restart point for resuming the activity, stopping the content associated with the activity from rendering at the head mounted display of the second user and providing the video content presented in the virtual reality space of the first user for rendering on the display screen of the head mounted display associated with the second user, and inserting user-related information of the second user into the virtual reality space shared by the first user.

In one embodiment, a request to leave the virtual tour is detected, wherein the request to leave is initiated by the second user. In response to detecting the request to leave, the video content of the virtual tour is stopped from rendering on the display screen of the head mounted display of the second user, and the activity that the second user was involved in prior to joining the virtual tour, is resumed from a restart point. The user-related information of the second user is removed from the virtual reality space shared with the first user.

In one embodiment, a method is disclosed. The method includes identifying a first virtual reality space of a first user wearing a first head mounted display. The first virtual reality space is defined on a display screen of the first head mounted display that is used to present content from a first application. A second virtual reality space of a second user wearing a second head mounted display, is identified. The second virtual reality space is used to present content from a second application, wherein the content presented in the first virtual reality space is different from the content presented in the second virtual reality space. An invitation to join the first virtual reality space of the first user, is detected. The invitation is extended by a first user to the second user. Content from the first virtual reality space of the first user is shared with the second user, upon the second user accepting the invitation. The sharing causes the content rendered in the first virtual reality space and the second virtual reality space to be synchronized.

In one embodiment, when the first or the second user moves, the content presented in the first and the second virtual reality spaces is dynamically adjusted to coordinate with a new location or a new direction that correlates with the movement of the first or the second user.

In another embodiment, a method is disclosed. The method includes providing content of a virtual environment scene for rendering on a display screen of a head mounted display associated with a first user. The content for the virtual environment scene is provided by an application. The display screen defines a first virtual reality space of the first user. A request from a second user to join the first virtual reality space of the first user to view the content, is detected. The first user's acceptance of the request is detected. In response to detecting the acceptance, the second user is transitioned to the first virtual reality space of the first user by providing the content for rendering on the display screen of the head mounted display of the second user. The content is rendered in a second virtual reality space defined on the head mounted display associated with the second user and is synchronized in substantial real time with content rendered in the first virtual reality space.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 4A and 4B conceptually illustrate sharing of content rendered in a virtual reality space based on request initiated by a first user to a second user, in accordance with an embodiment of the invention.

FIGS. 4C and 4D conceptually illustrate sharing of content rendered in a virtual reality space based on request initiated by a second user to a first user, in accordance with an alternate embodiment of the invention.

DETAILED DESCRIPTION

The following embodiments describe methods and apparatus for sharing and synchronizing content across multiple head mounted displays and correlating user interaction to the content rendered in the virtual reality space defined in the head mounted displays.

It will be obvious, however, to one skilled in the art, that the present invention may be practiced without some or all of these specific details. In other instances, well known process operations have not been described in detail in order not to unnecessarily obscure the present invention.

Figure 1A:
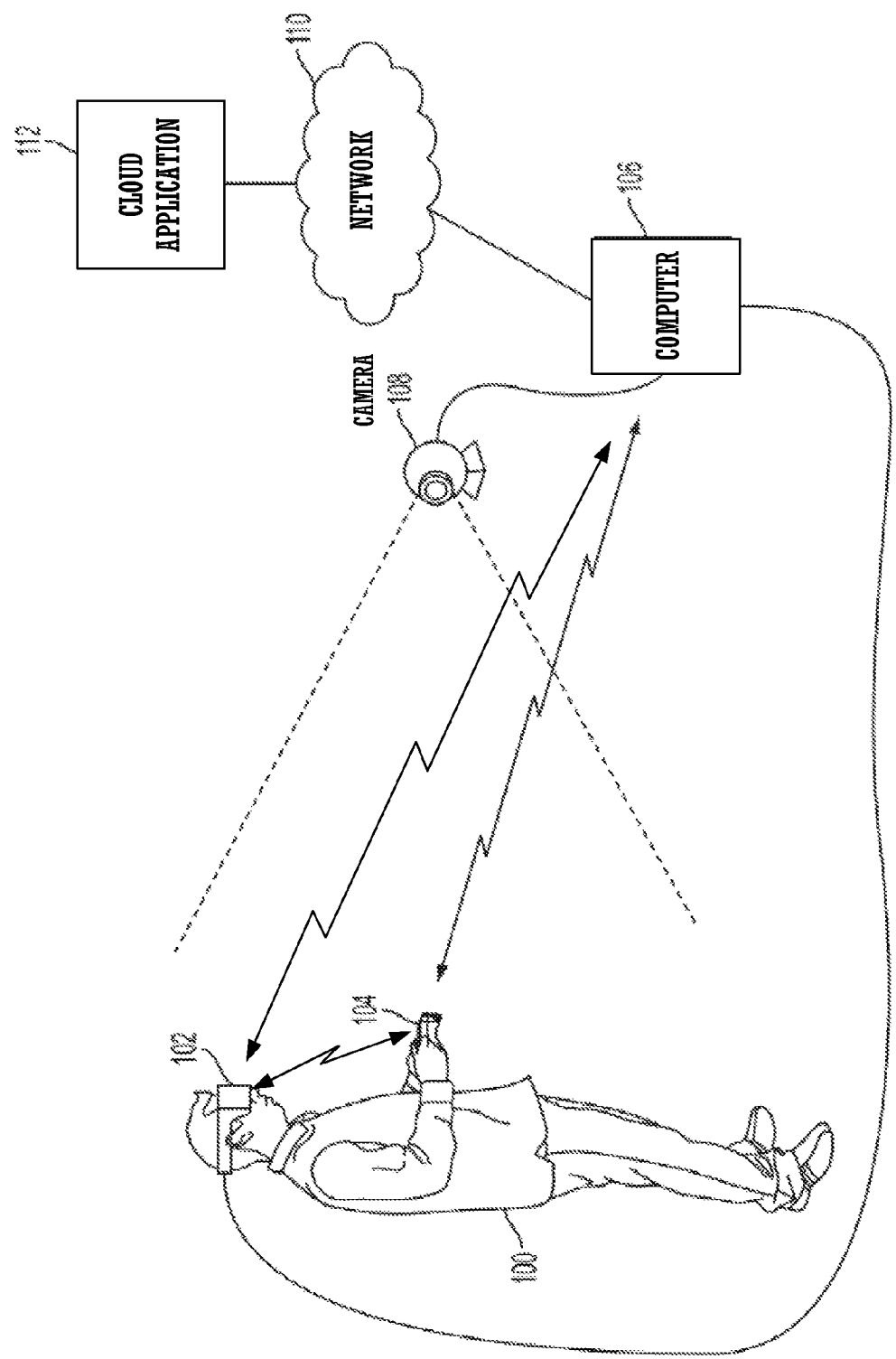
FIG. 1A illustrates a system configuration for executing an interactive application, such as a video game, using a head mounted display device in accordance with an embodiment of the invention.

FIG. 1A illustrates a system for executing interactive application, such as an interactive video game, in accordance with an embodiment of the invention. A user 100 is shown wearing a head-coupled or a head-mounted display (HMD) 102. The HMD 102 is worn in a manner similar to glasses, goggles, or a helmet, and is configured to display a video game or other application content (interactive content and non-interactive content) to the user 100. The HMD 102 provides a very private and immersive experience to the user 100 by virtue of the display mechanisms provisioned in close proximity to the user's eyes. The HMD 102 provides display region(s) in front of one or each of the user's eyes which cover large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game application, and output the video and audio content from the video game for rendering by the HMD 102.

The user 100 may operate a controller 104 to provide input for the video game. Additionally, a camera 108 can be configured to capture image of the interactive environment in which the user 100 is located. These captured images can be analyzed to determine the location, view direction, and movements of the user 100, the HMD 102, and the controller 104. In one embodiment, the controller 104 includes one or more lights and/or visual indicator(s) which can be tracked to determine its location and orientation. Similarly, the HMD 102 may include one or more lights and/or visual indicators which can be tracked to determine the location and orientation of the HMD 102. The camera 108 as well as the HMD 102 can include one or more microphones to capture sound from the interactive environment. Sound captured by a microphone array may be processed to identify the location of a sound source. Sound from an identified location can be selectively utilized or processed by selectively filtering out other sounds not from the identified location. Furthermore, the camera 108 can be defined to include multiple image capture devices (such as stereoscopic pair of cameras), an IR camera, a depth camera, and combinations thereof.

In another embodiment, the computer 106 functions as a thin client in communication over a network 110 with a cloud application provider 112. The cloud application provider 112 maintains and executes applications, such as video games, that the user 100 interacts with. The computer 106 receives inputs from the HMD 102, the controller 104 and the camera 108, and transmits the same to the cloud application provider 112, which processes the inputs to affect the state of the executing application, such as the video game. The output from the executing video game, including video data, audio data, textual data, graphic data, haptic feedback data, etc., is transmitted to the computer 106. The computer 106 may further process the data before transmission or may directly transmit the data to the relevant devices. For example, video, audio streams, textual and graphic data are provided to the HMD 102, whereas a vibration feedback command is provided to the controller 104.

In one embodiment, the HMD 102, controller 104, and camera 108, may themselves be networked devices that connect to the network 110 to communicate with the cloud application provider 112. For example, the computer 106 may be a local network device, such as a router, that does not otherwise perform application processing (i.e., video game processing in case of video game application), but facilitates network traffic by passing data between the HMD 102, controller 104, camera 108 and the cloud application provider 112. The connections to the network by the HMD 102, controller 104, and camera 108 may be wired or wireless.

As mentioned earlier, the HMD 102 may include a plurality of lights or visual indicators that can be tracked using image capture devices. Each of these lights may be configured to have specific orientation, shape, and can be configured to have the same or different colors than the other lights. For example, the lights or visual indicators may be arranged on the front surface of the HMD 102, on a side surface of the HMD 102, and at corners of the HMD 102, so as to span the front and the side surfaces of the HMD 102. The lights or visual indicators can be identified in captured images of an interactive environment in which a user uses the HMD 102. Lights or visual indicators can also be disposed on the back side of the HMD 102 to allow further tracking of the orientation of the HMD 102 worn by the user. Based on identification and tracking of the different lights or visual indicators disposed on the surface of the HMD 102, the location and orientation of the HMD 102 in the interactive environment can be determined. It will further be appreciated that some of the lights or visual indicators may or may not be visible at all times depending upon the particular orientation of the HMD 102 relative to an image capture device. Also, different portions of lights or visual indicators may be exposed for image capture depending upon the orientation of the HMD 102 relative to the image capture device.

In one embodiment, the lights or visual indicators can be configured to indicate a current status of the HMD 102 to others in the vicinity, based on the state of an application that is selected for executing. For example, some or all of the lights may be configured to have a certain color arrangement, intensity arrangement, be configured to blink in certain ways, have certain on/off configuration, or other arrangement indicating a current status of the HMD 102, during active interaction with the application and a different color and intensity arrangement during inactive state. The lights might also be configured to indicate different levels of the application, such as relative intensity levels of gameplay. For example, the intensity of lights, or a rate of blinking, may increase when the intensity of gameplay increases to provide an indication to other people what the user is engaged in and a sense of the level of the game.

The HMD 102 may additionally include one or more microphones. The data from the microphones is processed to determine the location and/or direction of the sound source.

The HMD 102 may also include one or more image capture devices (not shown), in one embodiment, such as stereoscopic cameras, IR cameras, etc. By utilizing a stereoscopic pair of image capture devices, three-dimensional (3D) images and video of the environment can be captured from the perspective of the HMD 102. Such video can be presented to the user to mimic a "video see-through" mode while wearing the HMD 102. In this embodiment, the display screen of the HMD 102 is considered to be "opaque" in nature and the video captured by the image capture devices can provide a functional equivalent of the external environment in the vicinity of the HMD, as if looking through the HMD. The presented video can be augmented with virtual elements to provide an augmented reality experience, or may be combined or blended with virtual elements in other ways. It will be appreciated that there may be any number of externally facing cameras installed on the HMD 102, oriented in any direction. For example, in another embodiment, there may be cameras mounted on the sides of the HMD 102 to provide additional panoramic image capture of the environment.

The HMD 102 may also include a sleeve/pocket to hold an external computing device 107 (not shown), such as a mobile phone device, in one embodiment. The functionality of the sleeve may be similar to a "docking station" in that the sleeve may provide power to the external computing device 107 received therein and connection to the HMD 102, controller 104 (that is also connected to the HMD 102) directly or through the network, when the external computing device 107 is received into the sleeve/pocket. In one embodiment, the external computing device 107 may provide the computing resources to process the data captured by the various modules with in the HMD 102 and various devices communicatively connected to the HMD 102 and/or the external computing device 107 and transmit the processed data to the computer 106 for further processing. In an alternate embodiment, the external computing device 107 may provide the processing resources to execute the application thereon and transmit the content to the HMD 102 for rendering on the display screen of the HMD 102. In one embodiment, the display screen of the external computing device 107 may also be used to render content from the application, thereby providing an alternate display screen for rendering the content. In one embodiment, the content rendered on the display screen of the external computing device 107 that is docked to the HMD 102 may be synchronized with the content that is being rendered on the display screen of the HMD 102 and such synchronization may continue even after the external computing device 107 has been disengaged from the sleeve of the HMD 102.

Figure 1C:
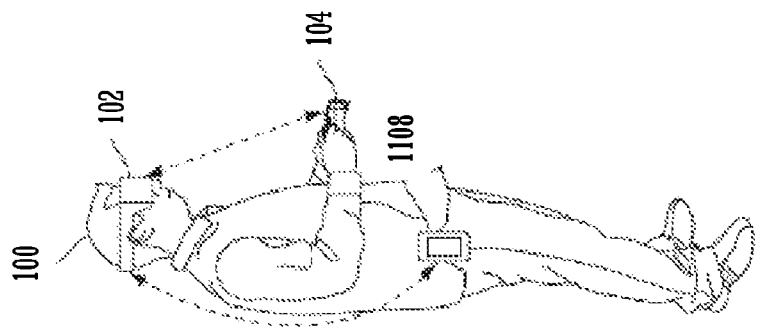
FIG. 1C illustrates a configuration for operating a head-mounted display device, in accordance with an alternate embodiment of the invention.
Figure 1B:
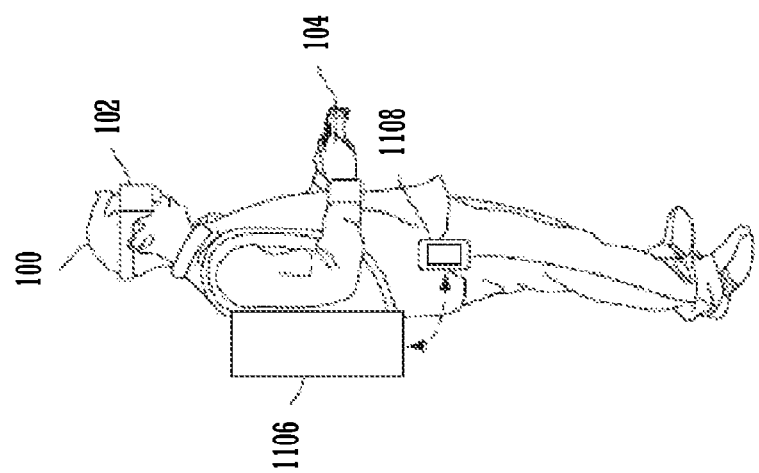
FIG. 1B illustrates a configuration for operating a head-mounted display device, in accordance with an embodiment of the invention.

FIG. 1B illustrates a configuration for operating a head-mounted display device 102, in accordance with an embodiment of the invention. In the illustrated embodiment, a user 100 is shown wearing an HMD device 102. The HMD device 102 is connected to a wearable computing device 1106. In one embodiment, the wearable computing device 1106 is in the form of a backpack or other body-attachable unit or may be carried in a backpack/body attachable unit. A controller 104 is operated by the user 100, and communicates input data to the computing device 1106. The user 100 may have an external computing device, such as a mobile device 1108 (e.g. a cellular phone), that communicates with the wearable computing device 1106. The wearable computing device 1106 may be configured to execute an interactive application, such as a video game, and provide video, audio, textual and/or graphical data to the HMD device 102, which may be used to render a view of a virtual environment scene defined by the video game. In an alternate embodiment, a display screen of the mobile device 1108 may also be synchronized with the display screen of the HMD device 102 such that the content that is rendered on the HMD device 102 may be simultaneously rendered on a display portion of the mobile device 1108.

FIG. 1C illustrates another configuration for operating a head-mounted display device, in accordance with an embodiment of the invention. In the embodiment of FIG. 1C, the mobile device 1108 communicates directly with the HMD device 102. In some implementations, the HMD device 102 is configured to execute the interactive application, such as a video game. The HMD device 102 may therefore also communicate with the controller device 104 to receive input data, and may also receive text information from the mobile device 1108 for rendering on the HMD device 102. In yet another implementation, the video game may be executed by the mobile device 1108. In this embodiment, the mobile device 1108 may be configured to provide video and audio data for rendering to the HMD device 1102. The mobile device 1108, in one embodiment, communicates with the controller device 104 to receive input data.

Figure 2A:
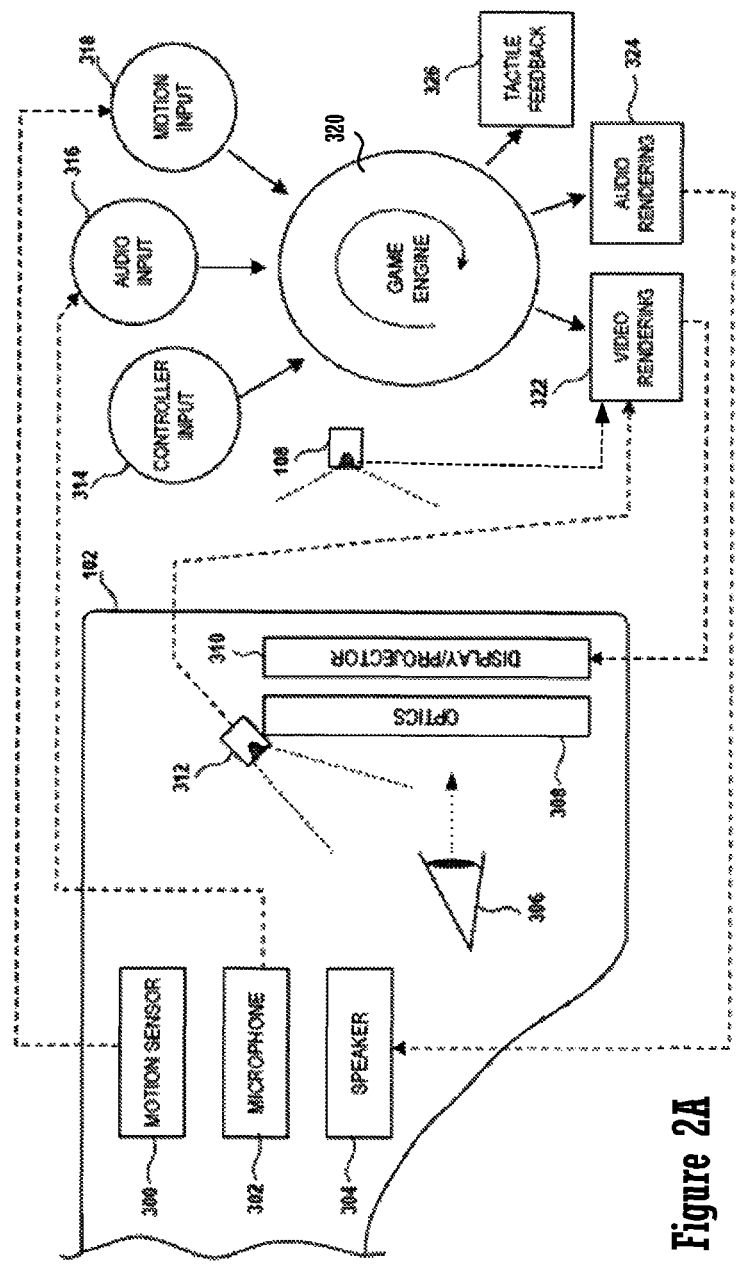
FIG. 2A conceptually illustrates the function of a HMD in conjunction with an executing application, such as a video game, in accordance with an embodiment of the invention.

FIG. 2A conceptually illustrates the functioning of different modules in the HMD 102 in conjunction with an executing interactive application, such as a video game, in accordance with an embodiment of the invention. The executing video game application is defined by a game engine 320 which receives inputs to update a game state of the video game. The game engine 320 may be disposed in a computer (represented by reference numeral 106 in FIG. 1A). The computer may be part of a cloud computing server disposed on a cloud and accessed over a network, a game console that is connected to the HMD or a computing device that can be accessed over a local area network, etc. The game state of the video game can be defined, at least in part, by values of various parameters of the video game which define or control various aspects of the current gameplay, such as the presence and location of objects, the conditions of a virtual environment, the triggering of events, user profiles, game points, game wins, view perspectives, etc.

In the illustrated embodiment, the game engine receives, by way of example, controller input 314, audio input 316 and motion input 318. The controller input 314 may be defined from the operation of a gaming controller (for e.g., controller 104) that is separate from the HMD 102. Controller input 314, by way of example, may include directional inputs, button presses, trigger activation, movements, or other kinds of inputs processed from the operation of the gaming controller. The audio input 316 can be processed from a microphone 302 of the HMD 102, or from a microphone included in the image capture device 108. The motion input 318, by way of example, may include gestures or movement of the HMD 102 that can be obtained from a motion sensor 300 included in the HMD 102, or from image capture device 108 as it captures images of the user or the HMD 102. The motion sensor may process motion input from inertial sensors, such as gyroscopes, magnetometer, accelerometer, etc., disposed in the HMD 102. The game engine 320 receives inputs from the motion sensor and/or the image capture device 108, processes the input, in accordance to the configuration of the game engine, to update the game state of the video game. The game engine 320 outputs game state data to various rendering modules which process the game state data to define content that is presented to the user.

In the illustrated embodiment, a video rendering module 322 is defined to transmit a video stream for presentation on the HMD 102. The video stream may be presented by a display/projector mechanism 310, and viewed through optics 308 by the eye 306 of the user. An audio rendering module 324 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, an inward facing camera 312 is included in the HMD 102 to enable tracking of the gaze of the user. The camera 312 captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the HMD 102, relative to a real world environment in which the user is situated, and/or relative to a virtual environment that is being rendered on the HMD 102.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD 102 described herein is capable of providing a user with a highly immersive experience, enveloping a large proportion or even an entirety of a user's field of vision. At times, the user may desire to share this immersive experience with select ones of other users within his social network. Thus, in accordance with embodiments of the invention described herein, methods, apparatus, and systems are provided for sharing content of an interactive application across multiple head mounted display (HMD) devices and synchronizing the content within the unified space defined in the HMD devices.

Figure 2B:
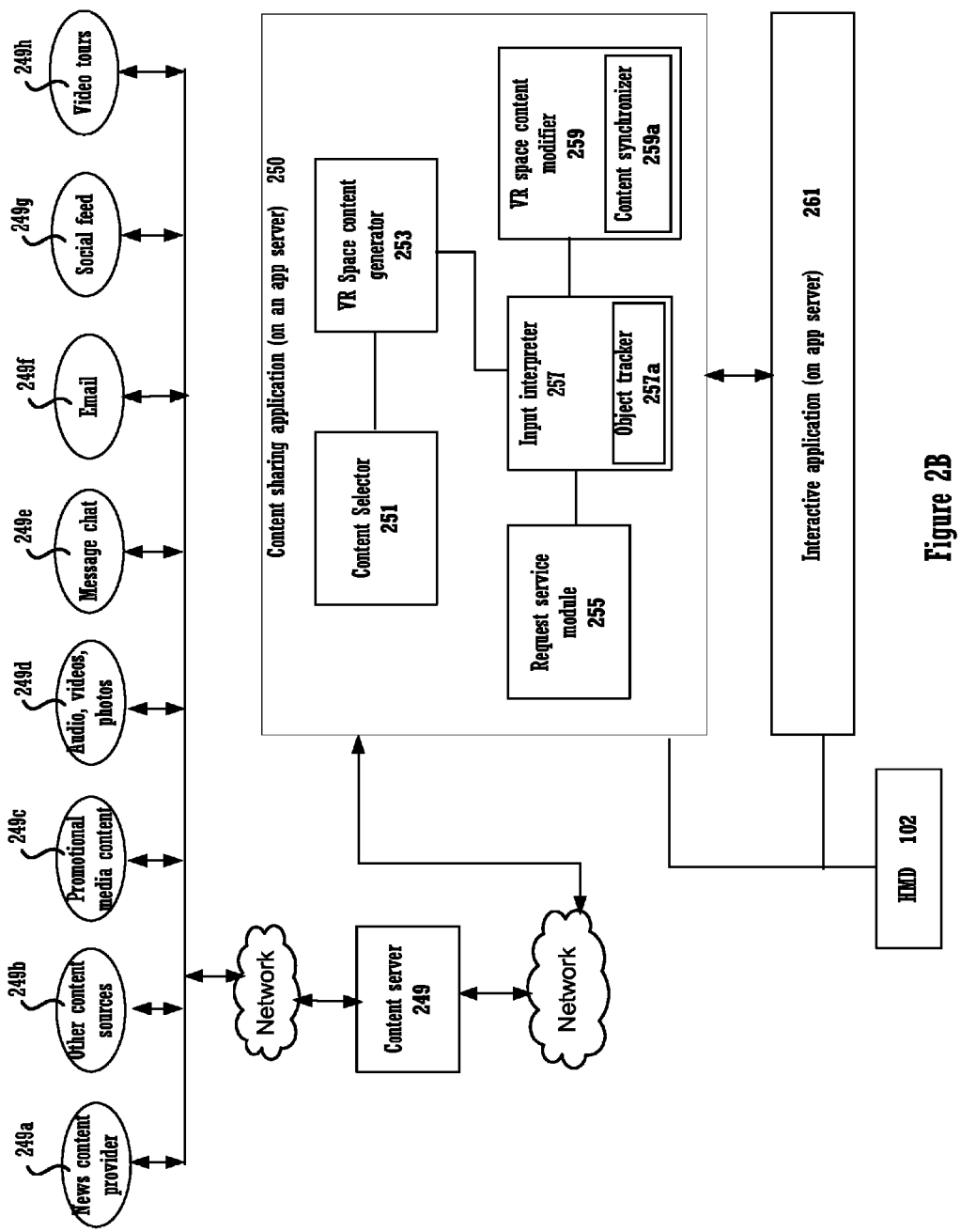
FIG. 2B illustrates an exemplary system for sharing content in a virtual reality space with multiple HMDs, in accordance with an embodiment of the invention.

FIG. 2B conceptually illustrates different modules of a content sharing application 250 that interact with the HMD 102 and allows sharing of interactive application content, in accordance with an embodiment of the invention. The content sharing application module 250 provides the ability to share content rendered in virtual reality space defined in one HMD 102 with other HMDs and computing devices. The content sharing application module 250 may be part of an interactive application 261 defined by the game engine or application engine or may be a separate stand-alone application that is configured to interact with the interactive application 261 defined by the game engine and/or other application engines to provide the desired content for sharing. In one embodiment, the content sharing application 250 executes on a computing device (for example, a server computer) that interacts with the HMDs of different users. In an alternate embodiment, the content sharing application 250 may be part of the HMD of a user and when executed, may be configured to connect and share content with the HMDs of other users. In yet another embodiment, a portion of the content sharing application 250 may be disposed on a computing device, such as a game console, a cloud server, a networked application server, etc., and a second portion may be disposed in the HMD 102. The content sharing application 250 may include a plurality of sub-modules including content selector module 251, virtual reality (VR) space content generator module 253, request service module 255, input interpreter module 257 and VR space content modifier module 259. It should be appreciated that the sub-modules listed are exemplary and that fewer or additional sub-modules may be included to interpret request for content and for sharing and/or synchronizing the content across multiple HMDs.

The content selector module 251 receives a request for content from a user wearing a HMD 102. The request may be provided through an interface rendered on a display screen of the HMD 102 and may be provided using controller input. The content requested may be of any type, including video, audio, photos, video tours, game content, email, social feed, message chat, news, internet content, promotional content, etc. The content selector module 251 authenticates the request by verifying the requesting user's identification and the appropriateness of the request by determining if the requesting user is authorized to view the content requested. This may especially be the case with emails, social feeds, message chats, or similar personal or private content. Upon successful verification, the content selector module 251 retrieves the content from the appropriate source 249a-249h. In one embodiment, the request may be forwarded to a content server 249 over a network and the content server 249 identifies and retrieves the appropriate content from any one or more of the content sources 249a-249h. The content server 249 may then provide the retrieved content to the content selector module 251. In alternate embodiment, the content server 249 may be a game console and may identify and transmit the appropriate content to the content selector module 251.

The content returned by the content server 249 is forwarded to a virtual reality (VR) space content generator module 253 where the content is formatted for a VR space defined in a display screen of the HMD 102 of the requesting user. The formatted content is forwarded to the HMD 102 for rendering in the VR space defined in the display screen of the HMD 102. In some embodiment, the formatted content may include interactive objects, scenes (in case of a game or video application), etc. User interaction detected in relation to the objects/scenes rendered in the VR space of the HMD 102 is transmitted to the input interpreter module 257. In some embodiment, user interaction may be provided as gestures or may be in the form of input provided through a controller or other input devices. The input is interpreted by the input interpreter 257 to define actions that need to be taken by a VR object(s) or toward a VR object presented in the VR scene or actions that need to be taken within the VR scene. Such actions are directed toward modifying an outcome of the interactive application 261 that provides content for the VR scene. The input interpreter 257 may include an object tracker sub-module 257a that is used to track the location, position, orientation of the real-world objects, such as a controller, HMD, etc., and user's limbs, such as hands, legs, etc., that are used to provide input to the interactive application 261. The object tracker 257a may receive tracking information of the real-world objects from one or more cameras disposed in the HMD 102 or external to the HMD 102. The input interpreter 257 may analyze the tracking information to determine the type of input provided by the HMD 102, the controller, other input devices and/or the user and transmits this information to the VR space content modifier module 259.

The VR space content modifier module 259 interprets the input information provided by the input interpreter module 257, maps the location, position, orientation of the real-world object to location, position, orientation of the corresponding VR objects, scenes, etc., provided by the interactive application 261. Additionally, the user input provided through gestures and input devices may be interpreted to define actions to be performed to affect the outcome of the interactive application 261. The affected outcome of the interactive application 261 is rendered in the virtual environment scene of the HMD 102.

During the execution of the interactive application 261, a request to share the content may be received at a request service module 255. The request may be initiated by the user wearing the HMD 102, in one embodiment. In response to the request to share, one or more social contacts of the user may be retrieved from the user's one or more social network and provided on the display screen of the HMD 102 for selection. User selection for sharing the content is received from the HMD 102 identifying a second user, for example. In an alternate embodiment, the request to share the content may be initiated by a second user wearing a HMD 102. The second user may be in the vicinity of the first user, in the same geo location as the first user and/or may detect the first user interacting with an interactive application 261, and request the first user to share his VR space. The request service module 255 may authenticate the request and after successful authentication of the requester, the recipient, and the request, may allow the second user to join the VR space of the first user. The request service module 255 may send a request to the VR space content generator module 253 to share the content that is being presented in the VR space of the first user with the second VR space defined within the second user's HMD 102. Additionally, the request service module 255 may request the VR space content modifier module 259 to synchronize the content presented in the VR space, second VR space of the first and the second users so that the first and the second users are viewing the same content.

In one embodiment, the content identified for sharing may be directly transmitted from the first user's HMD 102 to the second user's HMD 102. In this embodiment, a processor disposed within the HMD 102 may interact with the sub-modules (for e.g., request service module, content generator module and the content modifier module) of the content sharing application 250 executing within the HMD 102 to share content presented in the VR space of the first user by transmitting the content rendering in the first user's VR space directly to the second VR space defined in the second user's HMD 102. In an alternate embodiment, the content sharing application 250 executing on an external computing device may receive a signal or instruction to share the content with the second user's HMD and, in response, transmits the content to the second user's HMD 102. In addition to sharing the content on the second user's HMD 102, the request may also identify a television, a second computing device or other display device associated with the second user on which the content needs to be shared. Based on the specifics provided in the request, the content sharing application may share the content from the VR space of the first user with the respective display device(s).

In response to the sharing of the content, the second user may be able to view the shared content in the second VR space defined in the HMD 102 associated with the second user. In one embodiment, the second user may not be permitted to interact with the interactive application or the content presented in the VR space of the second user's HMD. Instead, the content is provided for viewing only. This may be the case when content of a virtual tour of a geo location is provided for sharing in the second VR space. In an alternate embodiment, the second user may be permitted to interact with the interactive application 261. In this embodiment, interaction from the second user is received by the input interpreter 257 through the object tracker module 257a and the input is used to affect the outcome of the interactive application 261. The VR space content modifier application 259 interprets the second user's input and adjusts the content of the interactive application 261 so as to reflect the input from both the first and the second users. The content presented at the VR space of the first user and the second VR space of the second user is synchronized to allow the first and the second users to view the shared and synchronized content that includes the input from the first and the second users.

In one embodiment, the VR space content modifier 259 may allow augmentation of content by allowing introduction of user-related information, such as a user's avatar, identifier, representative image, etc., into the VR space presented at the HMD 102 of the first and the second users. In one embodiment, the VR space content modifier 259 may provide the first user's information in the second VR space of the second user and the second user's information in the VR space of the first user to provide an indication of the users that are sharing and viewing the content. In an alternate embodiment, only the second user's information may be provided in the VR space shared by the first user to provide information to the first user on the second user that has been invited for sharing the content. In an alternate embodiment, only the first user's information may be presented in the second VR space of the second user to provide information of the first user who requested the original content that is being shared.

When the first user or the second user wishes to leave the shared VR space, they may do so by selecting an appropriate option available at the VR space of the corresponding HMD 102. The request service module 255 receives the option selection and interprets the option selection to determine the intent of the first or the second user to leave the VR space. Based on the interpretation, the request service module 255 may signal the VR space content generator module 253 and the VR space content modifier module 259 to stop rendering the content at the appropriate VR space. For example, if the second user requested to leave the VR space, then the second VR space of the second user ceases to render the content that was shared by the first user. Additionally, if the first user's information was presented in the second user's second VR space, such information is blocked from rendering. In addition to stop rendering the content, the request service module 255 may determine if the second user was engaged in an activity or was viewing a different content prior to accepting a request to view the shared content. In case the second user was engaged in a prior activity or viewing different content, then the request service module 255 will interact with the content selector module 251 to resume the rendering of the content or resume the prior activity. In one embodiment, a restart point may be identified from which the content is to be rendered or activity has to be resumed and the content or the activity is started from the restart point. The restart point, in one embodiment, may have been previously set when the second user accepted the content sharing request extended by the first user, for example, and used when the prior activity is to be resumed.

If, on the other hand, the first user requests to leave the VR space, then the VR space of both the first and the second users ceases to render the content that was shared by the first user. Any user information presented in the corresponding VR space is removed. In one embodiment, upon ceasing rendering of the content that was shared by the first user, a portion of the interactive application 261 may be made available to the second user to allow the second user to continue interacting with the interactive application 261. The portion of the interactive application 261 that is provided may be an abridged version of the application, a portion that is less than the whole application or an application with less features to allow the second user to sample the interactive application 261. This option allows the second user to test the interactive application 261 before making a decision to buy the application, for example.

It should be appreciated that the specific implementations described herein may be applied for the rendering of any type of content from any interactive application source, including gaming related information such as interactive game scenes, in-game updates, score information, resource levels, energy levels, instructions, hints, in-game messages, game wins, player-to-player messaging/chat, captions, dialogue, player achievements, player status, etc., gaming and/or non-gaming social network activity such as social media streams, posts, messages, addition to a social graph, recent activity, popular activity, birthday reminders, social network application notifications, etc., mobile device related information such as incoming calls, alerts, notifications, text/SMS messages, chat messages, application notifications, etc., and other types of information such as calendar/schedule reminders, e-mail messages, television content, video streams, internet content, receipt of any of the foregoing, combinations of any of the foregoing, etc.

Figure 3A:
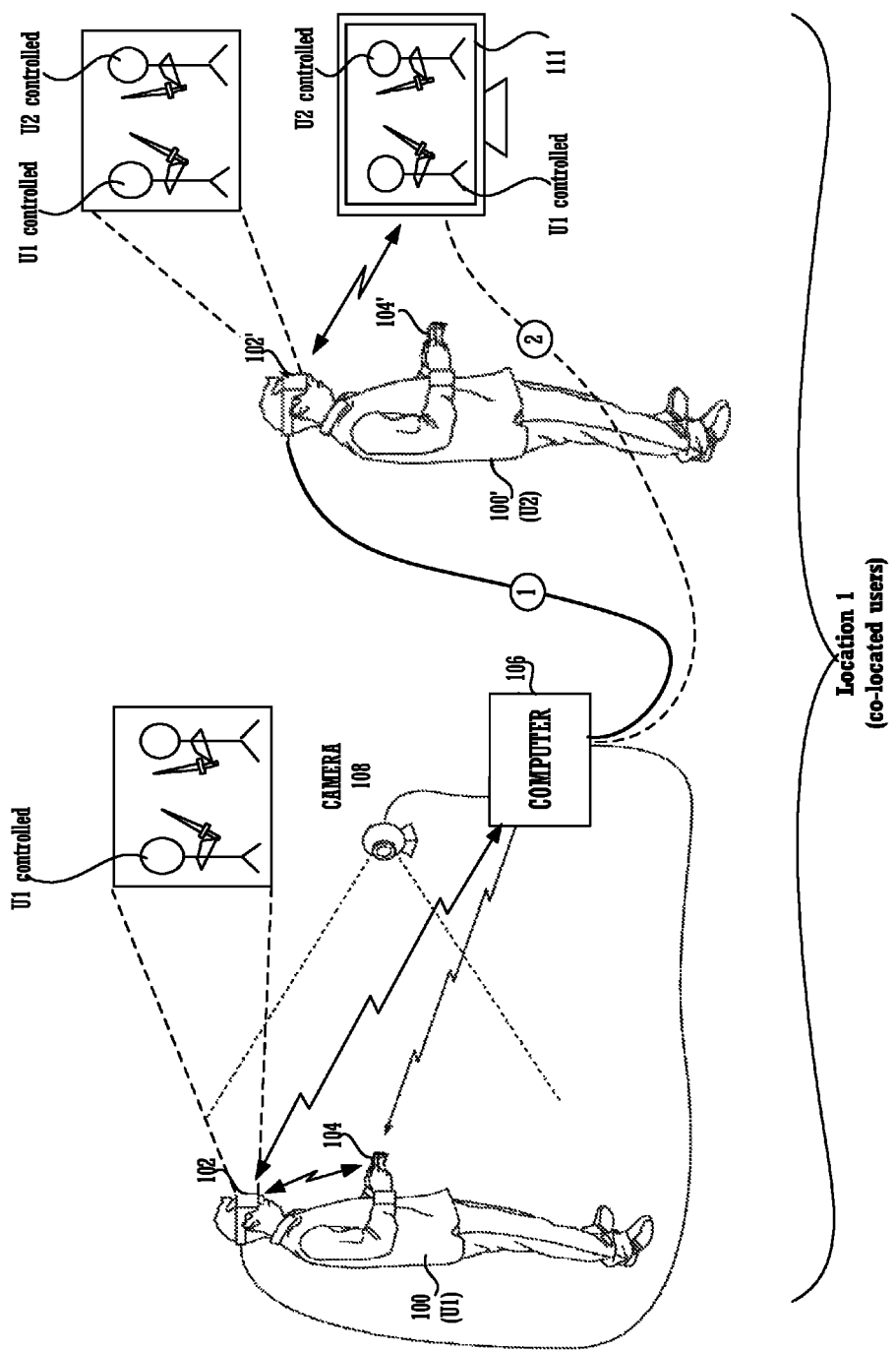
FIG. 3A illustrates a view of the virtual environment rendered on HMD devices as part of synchronizing multiple HMDs of users that are co-located, in accordance with an embodiment of the invention.

FIG. 3A illustrates a view of a display screen on a HMD 102 of a first user used for rendering content from a virtual environment scene provided by an interactive application, such as a video gaming application, and sharing of the content with HMDs 102' and other display devices 111 of other users that are co-located, in one embodiment. As shown, a first user U1 (100) is involved in gameplay of a video gaming application. The video gaming application may be executed on the computer 106 and the content transmitted to the HMD 102 through wired or wireless communication connection. As part of the gameplay, content from the gaming application is presented on a display screen of the HMD 102 associated with first user U1 (100). The display screen defines a virtual reality (VR) space of the first user in which the content from the virtual environment scene is rendered. The gaming application may include a plurality of virtual reality objects that may be selected and controlled by different users. In the embodiment illustrated in FIG. 3A, the first user U1 is shown to control a virtual reality object during gameplay.

A request for sharing the content from the VR space of the first user is detected by the application executing on the computer 106. The request may be initiated by the first user and include information related to a second user U2 (100') with whom the first user U1 (100) wishes to share the content. The second user U2 (100') may be a social contact of the first user U1 (100) and may be selected from the first user's social network. In one embodiment, the second user U2 is selected based on his/her online state. For example, the second user U2 may be one of the social contacts of the first user U1 who is active. An active user, in one embodiment, is defined as a user that is currently online and is actively using/interacting with an application. In an alternate embodiment, the request may be initiated by a second user U2 (100'). In this embodiment, the second user U2 (100') may be a social contact of the first user U1 (100). The request may be generated in response to the second user U2 detecting execution of the application by the first user U1. In one embodiment, the second user U2 may be in close physical proximity to the first user U1. In the embodiment illustrated in FIG. 3A, the second user U2 is shown to be co-located with the first user U1 in location 1.

Upon receipt of the request, the application may verify the authenticity of the request and the requester, in one embodiment, by verifying the identity of the requester and the recipient. As part of the verification, the application may determine the geo location of the first and the second users. Upon successful verification, in one embodiment, the application may check to see if the content is configured for sharing. If the content is configured for sharing, then the content is transmitted to the HMD 102' of the second user U2 for rendering, as illustrated by bubble 1 in FIG. 3A. To facilitate the transfer of content from the application, the HMD 102' of the second user U2 is communicatively connected to the computer 106 executing the application. In one embodiment where the application is executing on a cloud server, the HMD 102' of the second user U2 may be communicatively connected to the cloud server through a network, such as the Internet. The content that is presented on the HMD 102' of the second user U2 is synchronized with the content presented on the HMD 102 of the first user U1. The display portion of the HMD 102 and HMD 102' define the first and the second virtual reality space associated with the first and the second users (U1, U2), respectively.

In one embodiment, in addition to transmitting the content to the HMD 102' of the second user U2, the application executing on the computer 106 may also transmit the content that is presented on the first user's HMD 102 to a display screen associated with a second computing device or a television 111 of the second user, as illustrated by bubble 2 in FIG. 3, for rendering the content publicly on the display screen, so as to allow a third user to view what is being presented in the HMDs 102 and 102'. In this embodiment, the second computing device or the television 111 may be communicatively connected to the computer 106 through wired or wireless communication connection.

In an alternate embodiment, the second user U2 is provided with the capability to share the content with other users by allowing the second user U2 to transmit the content from his HMD 102' to a second computing device or a television, or another one or more HMDs of other users (not shown). In this embodiment, the HMD 102' of the second user U2 is communicatively connected to the second computing device, the television 111 or other HMDs 102 of other users with whom the second user U2 elects to share the content that was shared by the first user U1. The communication connection between the HMD 102' and the second computing device/television/other HMDs may be through wired or wireless connection with communication protocol that enables transmission of the content for the virtual environment scene provided by the application and rendered on the first user's HMD 102.

In one embodiment, user interaction may be allowed for the content shared by the first user U1. In this embodiment, user interaction may be used to affect outcome of the interaction application, such as modifying interactive virtual objects, etc., within the interactive scene, based on input provided by the first user U1 and second user U2. The interactions allow each of the user's U1, U2, to manipulate and control a distinct virtual object of the interactive application.

Figure 3B:
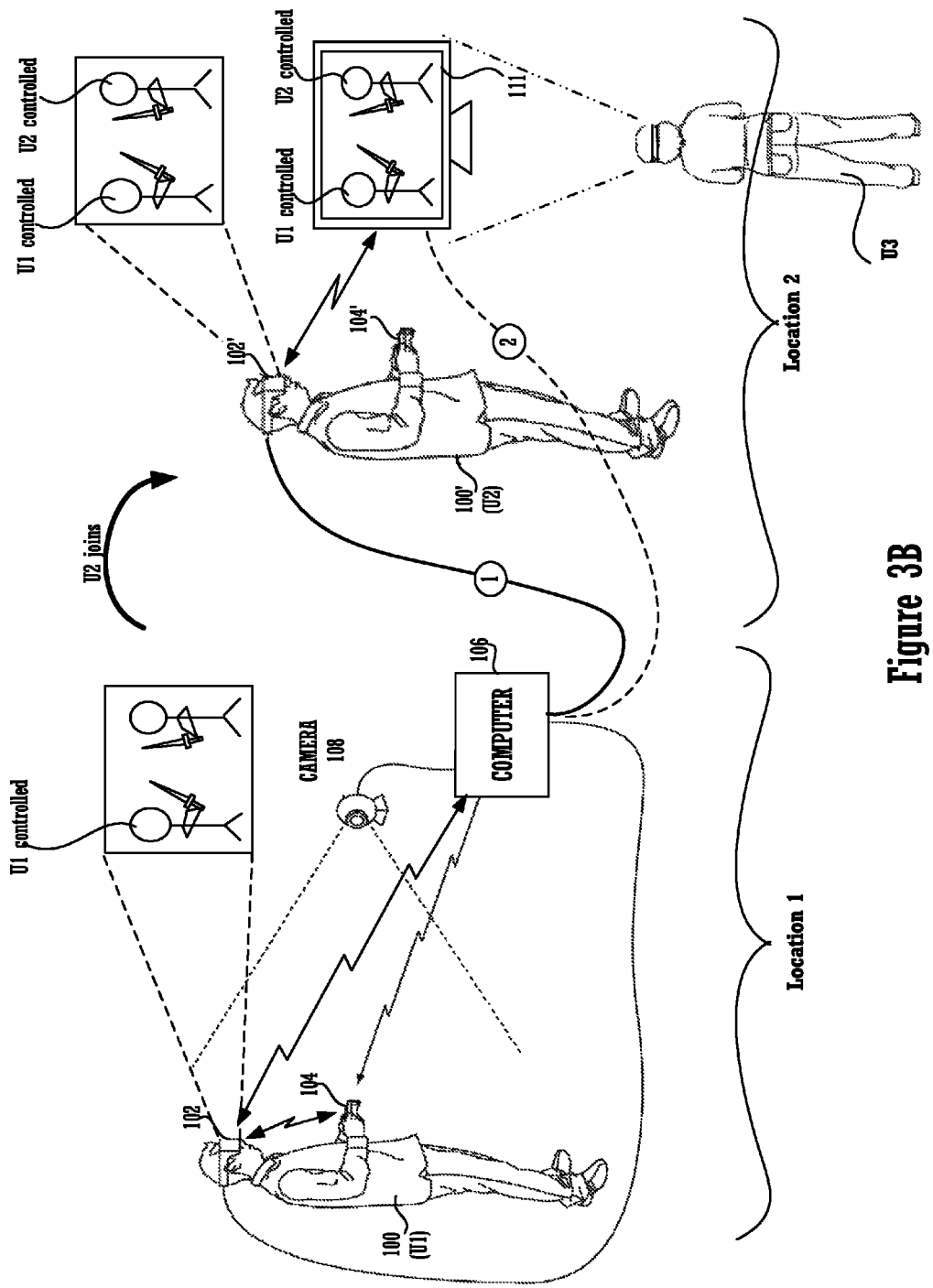
FIG. 3B illustrates a view of the virtual environment rendered on HMD devices as part of synchronizing multiple HMDs associated with remotely located users, in accordance with an embodiment of the invention.

FIG. 3B illustrates an alternate embodiment, wherein content from an executing application that is rendering on the first user U1's HMD 102 is also shared with a second user's HMD 102'. In this embodiment, the first user U1 and the second user U2 are remotely located with the first user U1 located in location 1 and the second user U2 located in location 2. In this embodiment, the computer 106 may be communicatively connected to the HMD 102' of the second user U2 (100') over the Internet through wired or wireless communication links, to allow transmission of the interactive application content to the HMD 102' for rendering. The content rendered on the HMDs 102 and 102' are dynamically synchronized so that the users U1 and U2 are viewing the same content. In one embodiment, first user U1 may be interactively controlling a virtual object of the interactive application and the second user U2 is a passive viewer who is allowed to just view the content on the display screen of his HMD 102' as the first user U1 is interacting with the interactive application. In another embodiment, user U1 may be interactively controlling a first virtual object of the interactive application and user U2 may be allowed to interactively control a second virtual object of the interactive application. In one embodiment, the first user or the second user may separately or jointly decide to socially share the content of the interactive application that is being rendered on the display screens of the HMD 102, 102'. In this embodiment, a signal may be generated by the first user U1 and/or the second user U2 that is interpreted by the interactive application executing on the computer 106, which then begins transmitting the content to a "social screen" 111 of a television or a display monitor/display device of a computing device based on the interpretation. The social screen 111, as used in the application, is defined as a publicly viewable display screen that allows content rendered thereon to be viewed by one or more users who are in the vicinity of the device. In the embodiment illustrated in FIG. 3B, the content that is rendered on the social screen 111 is being viewed by user U3 who is in the vicinity of the social screen 111 in location 2. In one embodiment, the application may verify to see if the content is identified for sharing before transmitting the content to the social screen 111 for sharing with other users. This additional verification may be to ensure that content that is to be kept private is not shared publicly.

FIGS. 4A-4D illustrate the different options of receiving a request for sharing content rendered on a HMD of a user. In the embodiment illustrated in FIGS. 4A and 4B, a first user U1 is viewing content from an interactive application, such as gaming application, a video tour application, etc. The content is presented in a virtual reality space (i.e., VR space 1) defined on a display screen of the HMD of the first user U1. In one embodiment, the first user U1 may have elected to share the content with other users including users U2 and U12, who are identified from his/her own social network. In an alternate embodiment, the first user may be viewing the content that is also being accessed and viewed by the other users (users U2 and U12). In another embodiment, the first user may be viewing content that was shared by either user U2 or user U12 or both. In this embodiment, user U1 may be a social contact of user U2 or user U12 or both. The content presented in the VR space 1 of the first user U1 may be augmented by including, for example, real-world objects, comments, text, avatars of the other users that are viewing the same content, internet content, user-generated content, sponsored content, user-related information, or combinations thereof. The above list used for augmenting the VR space 1 is exemplary and should not be considered exhaustive.

In one embodiment, the first user U1 who controls the sharing of content presented in the VR space 1 defined in the HMD 102 of the first user, is a primary user. The user with which the primary user shares the content is a secondary user. The secondary user, in one embodiment, is allowed to view the content but may not be allowed to interact or further share the content with other users. The application, in this embodiment, is said to be operating in mode 1 by allowing only one primary user to control content sharing and multiple secondary users to view the content that is being shared by the primary user. In an alternate embodiment, a second user may be provided with the ability to interact with and share the content with other users within his/her social network. In this embodiment, the second user is designated as a primary user and is provided with same privileges as the first user for sharing the content with HMDs of other users. The application, in this embodiment, is considered to be operating in mode 2 in which multiple primary users are allowed to control content sharing of the interactive application with each primary user having the ability to share the content with a plurality of secondary users. In one embodiment, each of the primary users may be provided with the ability to designate additional primary users thereby allowing the newly designated primary users to share the content with other secondary users. Each of the additional primary and secondary users selected for sharing may be chosen from the respective primary user's social network.

Thus, as illustrated in FIG. 4A, the first user U1 may initiate a share request to a second user U4 requesting the second user U4 to join the VR space 1, as illustrated by bubble 'A'. The second user U4 may be a social contact of the first user U1 and may be selected from a social network of the first user U1. At the time of receipt of the share request, the second user U4 may be immersed in content that is rendering in his own VR space (VR space 2) and there may be additional users, U10 and U3, who may be social contacts of the first user U1, of the second user U4, or may be independent users who are in the vicinity of the first and/or second users and are immersed in their own VR space (VR spaces 3 and 4, respectively). When the share request is presented to the second user U4, the second user U4 may choose to ignore/decline the request or may elect to join the VR space 1 of the first user U1. If the second user elects to ignore/decline the request, the second user U4 may continue to immerse in content that is rendered in his VR space 2. If, on the other hand, the second user U4 elects to accept the request and join the VR space 1, then he may send a response back to the first user U1 showing his interest to join VR space 1 of the first user U1, as illustrated by bubble 'B' in FIG. 4B. In response to the second user U4 accepting the invitation to join, the second user U4 is transitioned to the VR space 1 of the first user U1. This is done by the interactive application sharing the content rendered in the VR space 1 of the first user U1's HMD with the second user U4. The shared content is rendered on the HMD of the second user by first stopping the content that is currently being rendered in the VR space 2 defined in the second user's HMD, and then presenting the content that is rendered in VR space 1 in the VR space 2. The content rendering in VR space 2 is synchronized with the content in VR space 1.

FIGS. 4C and 4D illustrate an alternate embodiment, wherein the share request is originating from a second user U4 and directed to the first user U1 who is viewing content in VR space 1. The second user U4 may be co-located (i.e., in the vicinity) with the first user U1 or the second user may be remotely located but have an indication that the user U1 is interacting with the interactive application. The indication may be determined by checking user U1's online status, by visiting social media sites, etc. In the embodiment illustrated in FIG. 4C, the second user U4 sends a request to join the VR space 1 of the first user U1. The interactive application detects the request to share content from the second user U4 and performs the necessary verification of the second user U4. The verification may be to determine if the second user U4 is socially related to the first user U1 and the verification may be done by checking the social contacts of the first user U1. In an alternate embodiment, the first user U1 may not be socially related to the second user U4 but may have shared common interests. The verification may, in this embodiment, be to verify the interests of the users. Upon successful verification of the social or interest connection of the first and second users, the application may determine if the content rendering in the VR space 1 is configured for sharing. If the content is configured for sharing and user U1 has accepted the request to share the content, the application allows U4 to transition to U1's VR space 1 by transmitting the content from the VR space 1 to the HMD worn by the second user for rendering in the VR space 2 defined thereon, as illustrated in FIG. 4D.

Figure 5A:
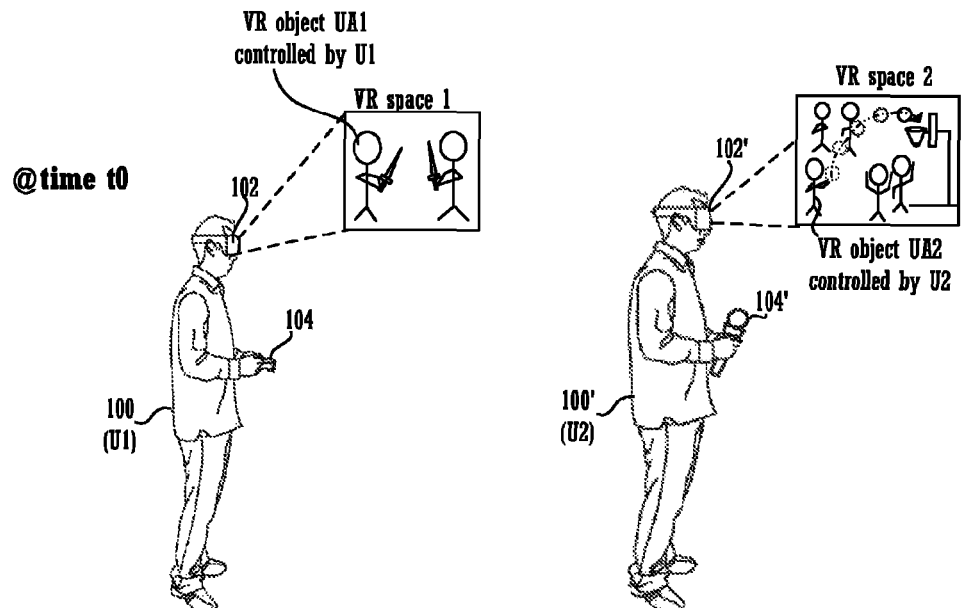
FIGS. 5A-5D conceptually illustrate user interaction reflected in a virtual environment, in accordance with an embodiment of the invention.

FIGS. 5A-5D illustrate a view of a virtual environment scene provided by an interactive application, such as a video gaming application, which can be rendered on a HMD device 102 of a first user U1 and shared with a second user U2, in one embodiment. FIG. 5A illustrates the content that is rendered in virtual reality spaces of different users at time t0. For example, the first user U1 may be presented with content from a first interactive application, such as a video gaming application 1, in VR space 1 defined for the first user U1 and the second user U2 may be presented with content from a second interactive application, such as video gaming application 2, in VR space 2 defined for the second user U2. It should be appreciated that the content for rendering in VR space 1 and/or VR space 2 may come from any application and not necessarily from a video gaming application. Further, the interactive applications 1 and/or 2 may allow user interaction with the interactive game scene and such user interaction translates to user input that changes the outcome of the respective interactive application. For instance, the first user U1 may select a VR object within the interactive game scene of the first application to interact with and user U1's input may be used to manipulate the selected VR object. Similarly, the second user U2 may be interacting with a VR object within the interactive game scene of the second application and the user U2's input may be used to manipulate the selected VR object. The input from the users U1, U2, may be provided through real-world objects, such as a user input device (i.e., a controller, etc.) or through gestures using user's body parts, such as limbs, etc., and such user input may be synchronized with the respective VR objects in the interactive game scene. For example, position of the objects handled/controlled by the users or the position of the users' body parts may be tracked by one or more cameras and the position of these objects may be coordinated and synchronized to particular positions or actions of the respective VR objects in the interactive game scene.

FIG. 5A illustrates the VR object that the first user U1 has selected to interact with as a VR character UA1 in VR space 1 and the second user has selected to interact with a second VR character UA2 in VR space 2. User input from the first and the second users U1, U2, are used to change the outcome of the application. FIG. 5A illustrates exemplary controllers 104, 104' that are used by the first and the second users U1, U2, to interact with the respective applications (such as interact with virtual objects provided by the application). Of course, other types of controllers or input devices may be used to provide user input.

Figure 5B:
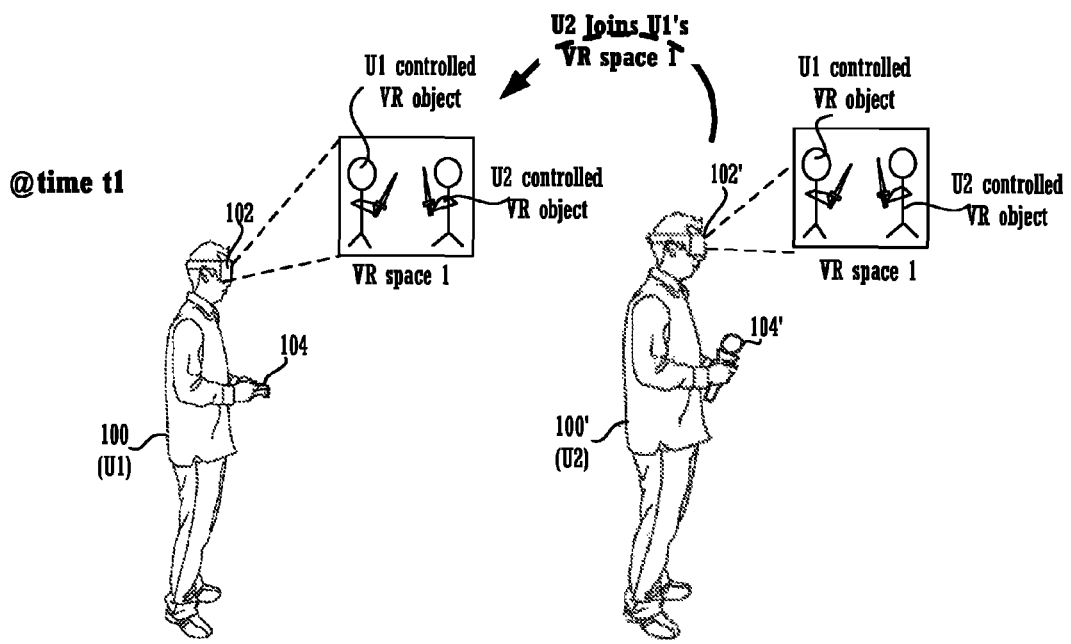

When an invitation to join the VR space 1 is sent by a first user U1 to a second user U2, the second user U2 is allowed to join the VR space 1 of the first user U1, as illustrated in FIG. 5B, by providing access to view the content presented in VR space 1, upon the second user U2 accepting the invitation. In one embodiment, the second user U2 is allowed to view but is not allowed to interact with any VR objects within the interactive game scene presented in VR space 1. In another embodiment, the second user U2 is allowed to interact with the VR objects presented in the interactive game scene, in response to the second user U2 accepting the invitation to join the VR space 1 of the first user U1. In this embodiment, the second user U2 may be provided with an option to select a VR object from within the interactive game scene provided in the VR space 1 and interact with the selected VR object. User input from the first and the second users U1, U2, are used to affect the outcome of the application and the interactive game scene rendered in VR space 1 is adjusted in accordance to the outcome of the application.

Figure 5C:
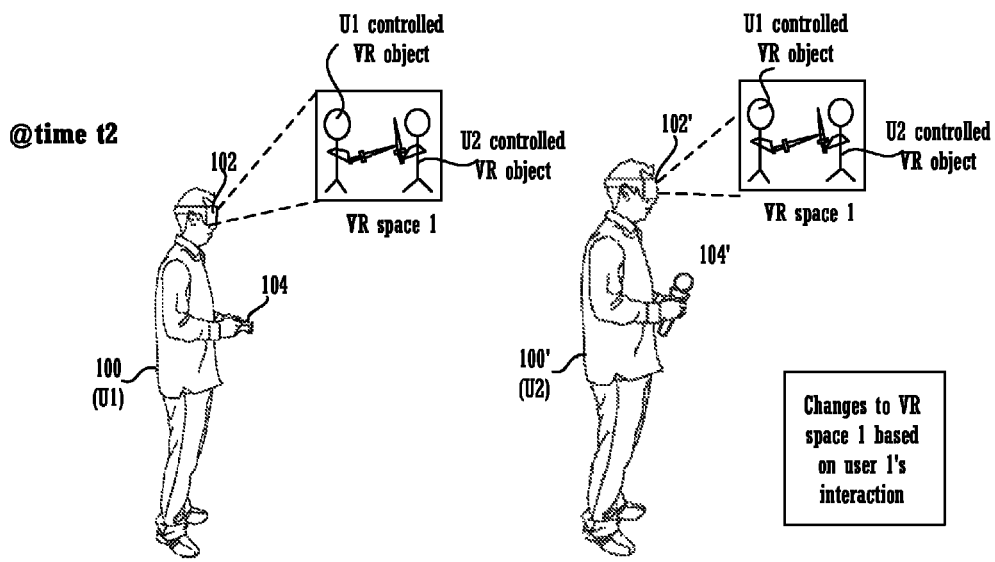
Figure 5D:
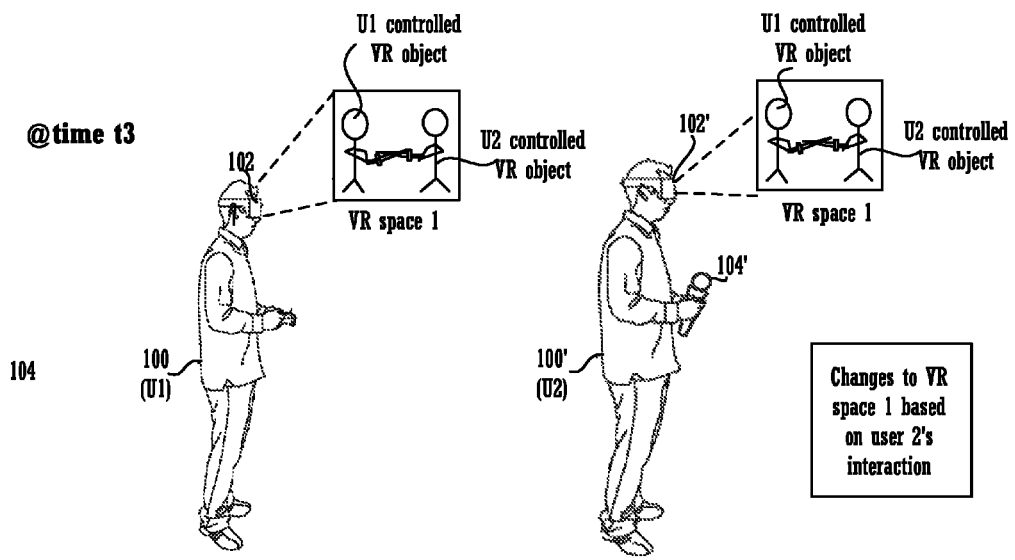

FIGS. 5B and 5D illustrate screen views of such user interactions at times t1 and t3, respectively, wherein VR object 1 within the game scene is controlled by input from the first user U1 and FIG. 5C illustrates a screen view of user interactions at time t2 where VR object 2 is controlled by input from the second user U2.

It should be appreciated that the first user U1 may interact with the first application using a first type of controller or input device and the second user U2 may interact with the first application using a second type of controller or using gesture or an input device other than the first type of controller. Irrespective of the input device or mode used to interact with the application, the input keys/gestures provided by the first and the second users U1, U2, using different input devices/gestures are mapped to specific actions that are to be taken by the first application to affect the outcome of the application.

In one embodiment, a first user U1 may access a virtual tour application and request a virtual tour of a geo location. In response to the request, the virtual tour application may return video content associated with the virtual tour. The returned video content is presented on a display screen of a head mounted display associated with the first user U1. The display screen defines a virtual reality space for the first user U1. In some embodiments, the video content is presented as a three-dimensional rendering to provide a more realistic experience to the first user U1. The video from the virtual tour may be presented as an interactive tour so as to make it appear that it has been captured from a first user's perspective. Consequently, as the first user U1 moves around, the perspective view provided in the virtual tour video also changes to accommodate the movement of the first user U1.

In one embodiment, the first user U1 may be viewing a video of a virtual tour using the virtual tour application. While the first user U1 is viewing the virtual tour, the first user U1 may desire to share the virtual tour with other users, such as his friends, relatives, business acquaintance, social contact, etc. Accordingly, the first user U1 sends an invitation to one or more of other users requesting them to join the virtual tour that the first user U1 is currently engaged in creating. In one embodiment, the other users are selected from one or more social networks of the first user U1. The other users may be viewing content from another application or may be engaged in an activity using their respective HMD. As each of the other users accepts the invitation to join the virtual tour, the rendering of content from another application or the activity the other user was engaged in is paused and the content from the virtual tour presented in VR space 1 begins to render in the respective user's HMD device, in substantial real time as the virtual tour is being viewed. In one embodiment, in addition to rendering the content, the respective users' avatar or user representative image or other user-related information may be included in the virtual reality space 1 so as to make it appear that the other users have joined the first user U1 during the virtual tour.

In an alternate embodiment, the video tour presented to and shared by the first user U1 may include information related to one or more of other users that have also requested the video content of the virtual tour for the geo location at the same time the first user U1 requested the virtual tour. In this embodiment, as in the previous embodiment, the information related to other users may include their avatar or user representative image to provide a perspective of the different users that have joined the virtual tour. It should be appreciated that avatar is one type of information that may be included in the VR space 1 and that other information related to the user may also be included in the VR space 1 shared with other users. The sharing causes the content from the virtual tour of the geo location to be rendered in the respective users' HMD devices. The content rendered in each of the users HMD device is synchronized with the content rendered in the first user's HMD device.

In one embodiment, the first user U1 may invite a second user U2 to join in the virtual tour. In this embodiment, when the second user U2 accepts the invitation, the content from VR space 1 is rendered in the second user U2's HMD. Along with the content, user-related information of the first user U1 is included in the VR space 1 rendered in the second user U2's HMD and the user-related information of the second user U2 is included in the VR space 1 of the first user U1's HMD making it appear that the two users are taking the virtual tour together. In some implementations, the user-related information of the first user U1 and the second user U2 are slowly brought into focus at the respective VR spaces. The users viewing the virtual tour in the VR space 1 may be able to interact with the content and with one another and such interaction may be in the form of text, speech, gesture, posting, etc., and such interaction may adjust the content being rendered at the respective VR spaces. For example, if the first user or the second user move in a specific direction, the movement is detected by the application and the content being rendered at the VR spaces of the first or the second users HMDs may be adjusted to correspond with the detected movement. The interactions add depth to sharing of content and makes collaborative viewing much more interesting than just viewing of the content.

In one embodiment, the content for the virtual tour is content that was pre-recorded by the first user U1 or by one of the other users and made available for sharing. In another embodiment, the content for the virtual tour is content that is being captured by the first user U1 and shared with other users in substantial real-time. In one embodiment, the second user U2 may be engaged in viewing other content or may be engaged in an activity that is providing content at the second user U2's HMD at the time the invitation to join the virtual tour is received by the second user U2. In this embodiment, the request may be presented to the second user U2 as a user alert at the corresponding HMD. The second user U2 may respond to the user alert. As a result, the content that was being presented at the second user U2's HMD is ceased or the activity is paused and the video content from the virtual tour is rendered allowing the second user U2 to follow the first user U1 during the virtual tour of the geo location. In one embodiment, in response to the second user U2's action to the user alert, the second user U2's avatar or representative image or any other information related to the second user U2 may be included in the virtual space shared by the first user U1. The user-related information provides an indication of the number of users that are viewing the virtual tour with the first user U1.

When the second user U2 chooses to leave the virtual tour, the second user U2 may generate a signal or a user alert indicating his/her intention to leave the virtual tour. In response to the signal, the application may stop rendering the content from the VR space 1 on the second user U2's HMD. If the second user U2 was interacting with another application or was involved in an activity prior to joining the first user U1 in the virtual tour, the content from this application will begin to render or the activity will be resumed from a restart point that was established when it was paused. Additionally, if an avatar or representative image or information of the second user U2 was included in the VR space 1, in response to joining the virtual tour, the avatar, representative image or information of the second user U2 is removed from the VR space 1.

It should be appreciated that the various embodiments described with reference to inviting other users and sharing content from a virtual tour of a geo location may be extended to, for example, shopping (share review, provide/receive opinions, buy products/merchandise), hotel reservations (preview hotels through hotel tour and reserve), live sports events (review and share), advertisements/sponsored content that are customized to places or persons, games (share review, provide opinions, invite users to participate in the games (for e.g., invite a user to be a passenger in a race car) and buy) etc.

Figure 6A:
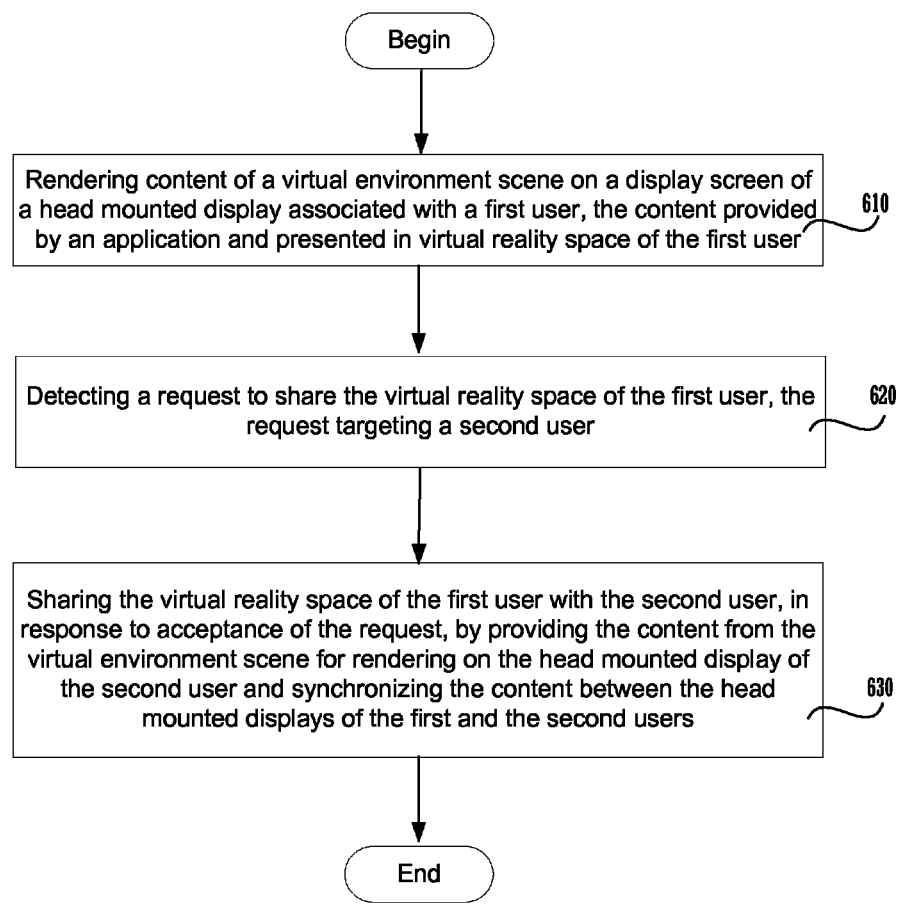
FIGS. 6A-6C illustrate exemplary flow diagrams each conceptually illustrating a process for synchronizing content across multiple head mounted displays, in accordance with different embodiments of the invention.

FIG. 6A is a flow diagram conceptually illustrating a process for sharing video content with a plurality of users on their HMDs and synchronizing the video content presented on the HMDs, in one embodiment. The process begins at operation 610, with content from a virtual environment scene being rendered on a display screen of a head mounted display associated with a first user. The content may be provided by any source and include content from e-mail, internet news, social networking feed, instant messaging/chat, calendar events, audio/video call, text message, application alert/a reminder, photos, video content associated with an event, a geo location, person, etc., or any combinations thereof. It should be appreciated that the aforementioned list of content is exemplary. The virtual environment scene may be provided by an executing application, such as an email application, virtual tour application, instant messaging application, calendar application, social utility application, photo application, etc. The display screen of the HMD defines a virtual reality space.

In operation 620, a request to share the virtual reality space of the first user, is detected. The request may be initiated by a first user and identify a second user from a social network of the first user. Alternately, the request may be initiated by a second user. The request may be initiated when the second user detects the first user immersed in the content from an application.

In response to the request to share, the virtual reality (VR) space of the first user is shared with the second user, as illustrated in operation 630. In some implementations, upon receiving a request to share, the user may respond by generating a signal granting the request. For example, when the request to share originates from a first user, the second user may generate a signal accepting the request to join the VR space of the first user. In the example where the request to share originates from a second user, the first user may generate a signal accepting the request to share the content from the VR space that the first user is currently engaged in viewing. In response to the signal, the application shares the VR space with the second user by transmitting the content rendering in the VR space of the first user to the second user's HMD. The application continues to synchronize the content during the time the second user shares the VR space with the first user.

Figure 6B:
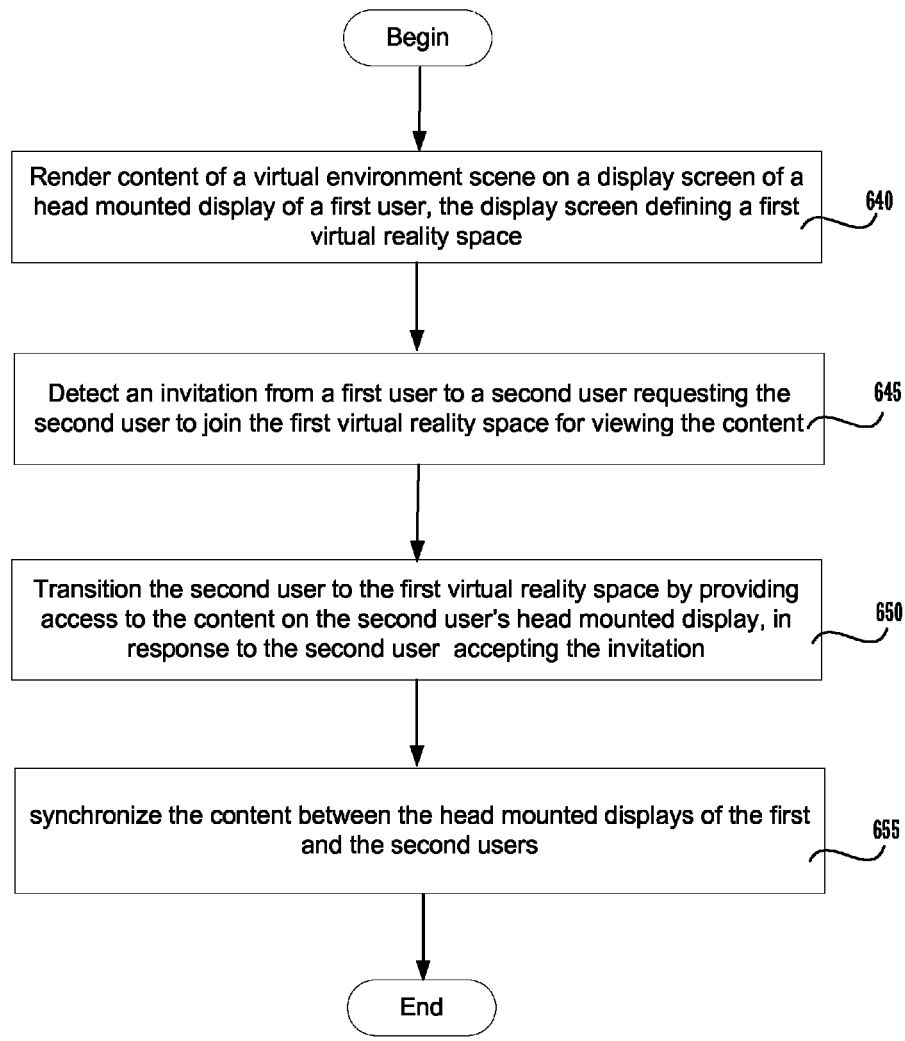

FIG. 6B is a flow diagram conceptually illustrating a process for sharing video content with a plurality of users on their HMDs and synchronizing the video content presented on the HMDs, in an alternate embodiment. The process begins at operation 640, with content from a virtual environment scene being rendered on a display screen of a head mounted display associated with a first user. The content may be provided by any content provider and may include interactive content. The virtual environment scene may be provided by an executing interactive application. The display screen of the HMD defines a first virtual reality space.

In operation 645, an invitation originating from a first user requesting the second user to join the virtual reality space of the first user, is detected. The second user identified in the request may be a social contact of the first user selected by accessing one or more social networks of the first user.

The second user may or may not accept the invitation to join the first virtual reality space of the first user. In the case when the second user declines the invitation, the second user continues to engage in an activity that he was engaged in before the invitation from the first user was received. In the case when the second user accepts the invitation, the application may detect the acceptance and, in turn, transition the second user's HMD display screen to the first virtual reality space of the first user by providing access to the content currently rendering in the first virtual reality space of the first user, as illustrated in operation 650. The content rendered in the HMD of the second user is synchronized with the content rendered in the HMD of the first user, as illustrated in operation 655.

Figure 6C:
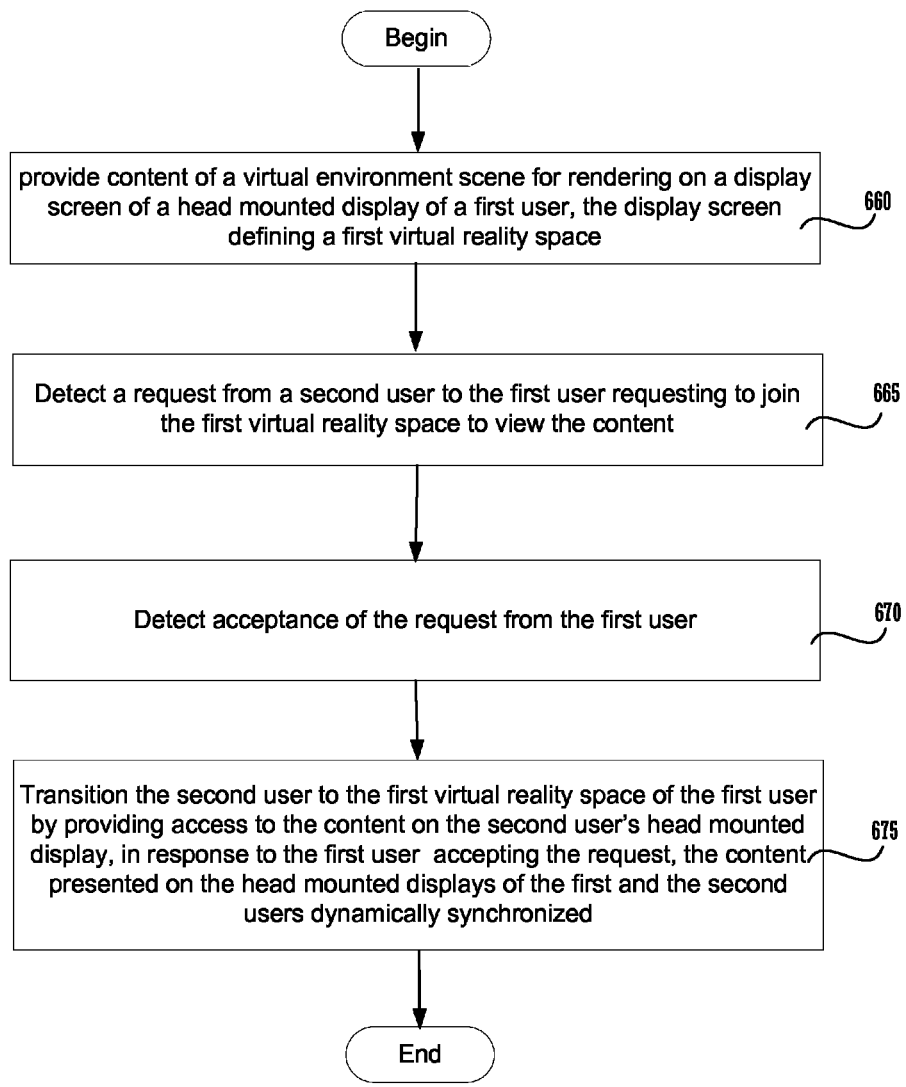

FIG. 6C illustrates flow diagram conceptually illustrating a process for sharing multimedia content with a plurality of users on their HMDs and synchronizing the video content presented on the HMDs, in an alternate embodiment. The process begins at operation 660, with content from a virtual environment scene being rendered on a display screen of a head mounted display associated with a first user. The content may be provided by any content provider and may include interactive content. The virtual environment scene may be provided by an executing interactive application. The display screen of the HMD defines a first virtual reality space.

In operation 665, a request to join the virtual reality space of the first user is detected, wherein the request is originating from a second user. The second user originating the request may be a social contact of the first user. The second user may initiate the request when the second user detects the online status of the first user and determines that the first user is immersed in the content from an application, for example.

The first user may or may not accept the request to allow the second user to have access to the content that is being rendered in the first virtual reality space of the first user. In the case when the first user declines the request, the second user continues to engage in the activity that he was engaged in before he initiated the request to join the first virtual reality space of the first user. In the case when the first user accepts the request, the application may detect the acceptance, as illustrated in operation 670 and, in turn, transition the second user's HMD display screen to the first virtual reality space of the first user by providing access to the content rendering in the first virtual reality space, as illustrated in operation 675. The content rendered in the HMD of the second user is synchronized with the content rendered in the HMD of the first user.

The various embodiments provide a collaborative multimedia content sharing application to enable the users to share their content with other users in substantial real-time. The users may be social contacts identified from one or more social networks. It should be appreciated that although some of the embodiments have been described for sharing videos, the embodiments may be extended to share any other multimedia content that is capable of being rendered on a HMD of a user or on a computing device.

Figure 7:
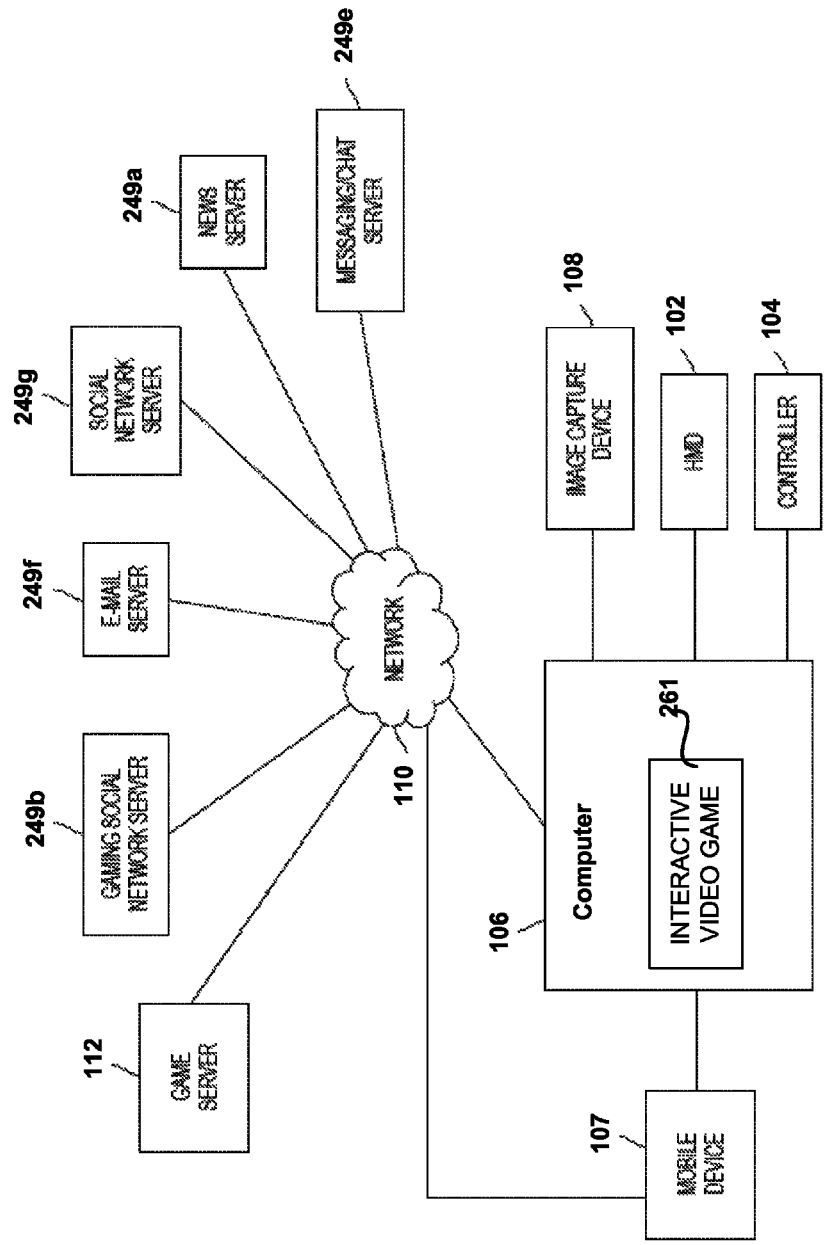
FIG. 7 illustrates a system for executing different application which provide content for rendering on a head mounted display of a user, in accordance with an embodiment of the invention.

FIG. 7 illustrates a system for rendering various types of content information on a head mounted display of a user, in accordance with an embodiment of the invention. A computer 106 is configured to execute a video game 261. The computer 106 may communicate over a network 110 to a game server 112. In some embodiments, the game server 112 is configured to store various types of information related to the video game 261, such as player progress, achievements, resources, etc. The game server 112 may also facilitate multiplayer gaming over the network 110, and so the game server 112 may communicate with other computing devices, which may execute other instances of the video game. In cloud gaming implementations, the game server 112 is configured to execute the video game 261 and provide video and audio data to the computer 106, with the computer 106 configured to act as a remote terminal or interface for communication with the executing video game at the game server 112. In some implementations, the game server 112 may instantiate the video game in a virtual machine and the data related to the video game generated at the virtual machine is shared with the computer 106.

A head mounted display 102 communicates with the computer 106. The head mounted display 102 may receive video and audio data from the computer 106 for rendering on the head mounted display 102. Furthermore, the head mounted display 102 may communicate input data to the computer 106, such as inertial sensor data, image capture data, gaze tracking data, and other types of data which can be detected or processed by the head mounted display 102. A controller device 104 is additionally provided as another input device for providing input to the videogame 261.

An image capture device 108, such as a camera, is configured to capture images of the real world interactive environment in which a user operates the head mounted display 102 and the controller 104. The computer 106 can be configured to process these captured images, to identify the position/location/orientation of various elements in the interactive environment, such as the user or parts of the user, the head mounted display 102, the controller device 104, other input devices, or any other element in the interactive environment. Additionally, the image capture device 108 can include at least one microphone for capturing sound from the interactive environment. In some implementations, a plurality of microphones are included to enable sound localization, that is, identification of locations from which sounds in the interactive environment are produced, and/or specific sources of such sounds (e.g. a user).

The executing videogame can define a virtual environment, and a view of the virtual environment can be rendered on the head mounted display 102 for viewing by the user.

In some implementations, a mobile device or other computing device 107 communicates with the computer 106. The computer 106 may be configured to receive text information, for example, from the mobile device 107 for display to the user. In response to receiving the text information, the computer 106 can be configured to determine when and how to render such text information on the head mounted display device 102. In various implementations, the mobile device 107 can be configured to receive various types of text or other multimedia content information, such as e-mail, social network updates, text messages, instant messages, chat messages, etc. The mobile device 107 may therefore communicate with various servers to receive such text or other multimedia content information, such as the various servers (e.g., game server 112, gaming social network server 249*b*, email server 249*f*, social network server 249*g*, news server 249*a*, messaging/chat server 249*e*, etc.) which are shown and described with reference to FIG. 7.

In additional implementations, the mobile device 107 may communicate directly with the head mounted display 102 to achieve similar or the same functionality as that described above regarding notification and/or display of text information to the user.

A gaming social network server 249*b* provides for a gaming social network, and also provides updates regarding the gaming social network (e.g. posts, news, etc.) to the computer 106, for display on the head mounted display 102. An e-mail server 249*f* provides for an e-mail account of the user, for which updates (e.g. new messages, etc.) can be provided to the computer 106 display on the head mounted display 102. A social network server 249*g* provides for a social network that is distinct from the aforementioned gaming social network server 249*b*. The social network server 249*g* can likewise provide updates regarding activity on the social network to the computer 106 for display on the HMD device 102. A news server 249*a* can be configured to provide a news feed to the computer 106, including headlines, articles, or other news information, for display on the HMD device 102. A messaging/chat server 249*e* provides for a messaging/chat service, such as text messaging, instant messaging, text/voice/video chat, etc. The messaging/chat server 249*e* can be configured to communicate messaging/chat information, such as notifications and/or message/chat content, to the computer 106 for rendering to the HMD device 102. In addition to the aforementioned servers providing content, additional servers, such as multimedia content servers, may provide content that can be communicated to the computer 106 for rendering to the HMD device 102.

Though the aforementioned servers have been described as communicating various kinds of text or other content information to the computer 106, it should be appreciated that a given server may first communicate such information to the game server 112, which may in turn relay the text information to the computer 106 for further processing and transmitting to the HMD 102, controller 104 or for directly transmitting to the HMD 102 and/or controller 104.

Various embodiments described herein have been described with reference to video games presented on a head-mounted display device. However, it will be appreciated that in accordance with other embodiments, the principles and methods thus described may also be applied in the context of other types of interactive applications, and in the context of presentation on other types of devices, including but not limited to televisions screens, display device of other computing devices, and other types of displays on which interactive applications may be presented.

Figure 8:
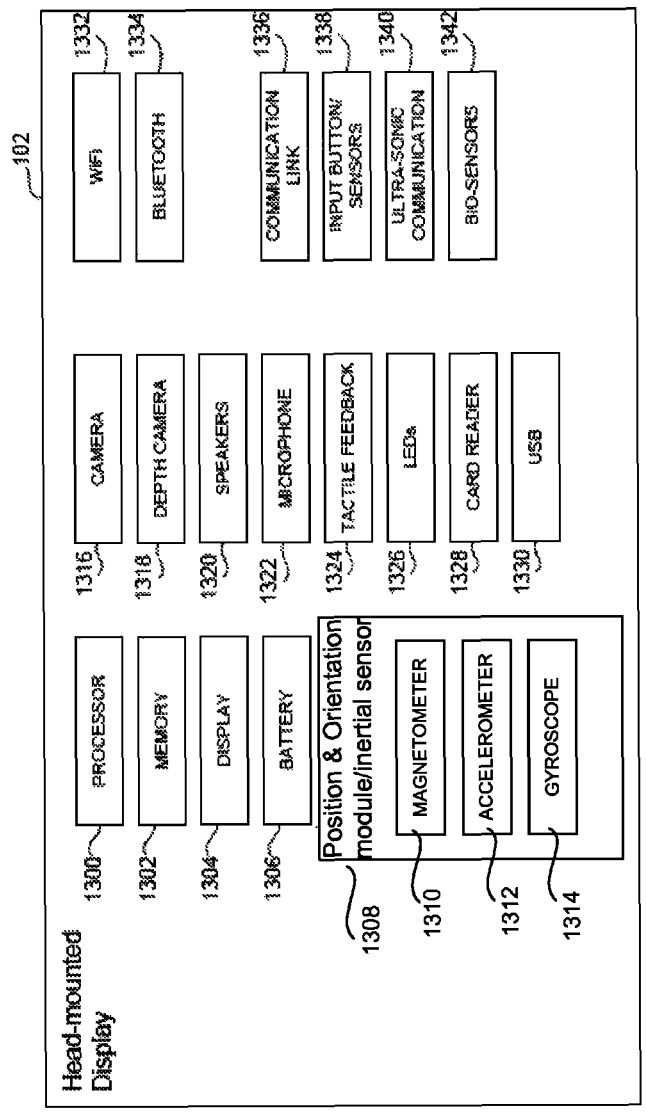
FIG. 8 illustrates components of a head-mounted display, in accordance with an embodiment of the invention.

With reference to FIG. 8, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module (e.g., position & orientation module/inertial sensor) 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope 1314 is a device for measuring or maintaining orientation, based on the principles of angular momentum. In one embodiment, three gyroscopes 1314 provide information about movement across the respective axis (x, y and z) based on inertial sensing. The gyroscopes 1314 help in detecting fast rotations. However, the gyroscopes 1314 can drift overtime without the existence of an absolute reference. This requires resetting the gyroscopes 1314 periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 (speaker 304 of FIG. 2A) for providing audio output. Also, a microphone 1322 (microphone 302 of FIG. 2A) may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user. In another embodiment, the tactile feedback module 1324 is capable of causing movement and/or vibration of the controller 104 to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 9:
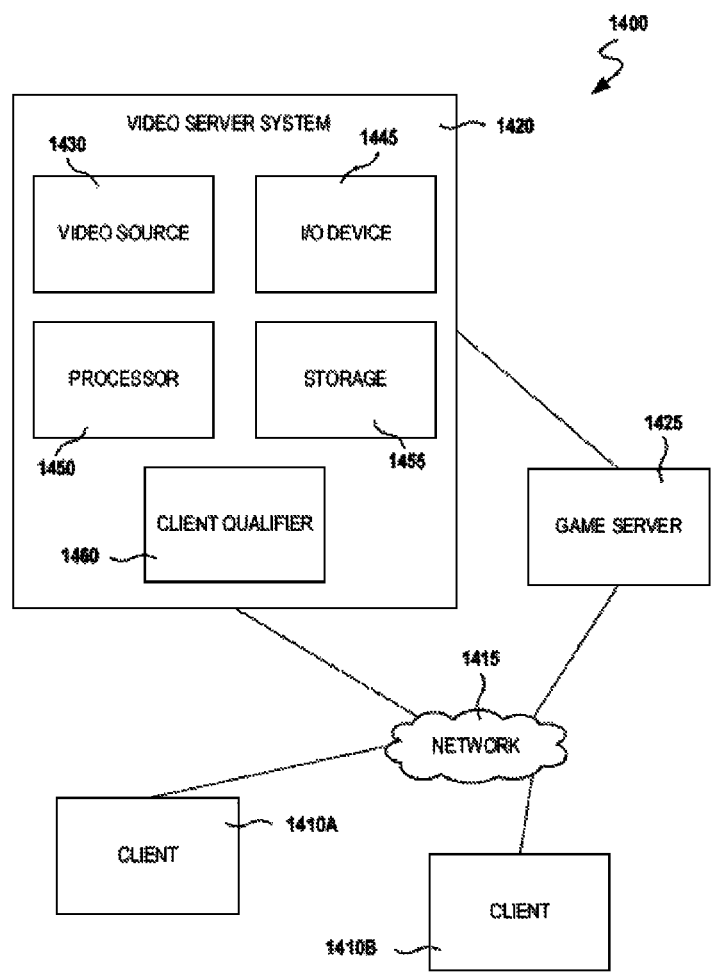
FIG. 9 is a block diagram of a Game System, according to various embodiments of the invention.

FIG. 9 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420.

Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    providing content of a virtual environment scene for rendering on a display screen of a head mounted display associated with a first user, in response to detecting a request for the content initiated by the first user, the content for the virtual environment scene is provided by an application and presented in a virtual reality space of the first user;
    detecting a request to share the virtual reality space of the first user, the request targeting a second user;
    providing the content of the virtual reality space of the first user for rendering on the display screen of the head mounted display of the second user, in response to detecting a signal accepting the request to share, the content being rendered in a second virtual reality space defined on the head mounted display associated with the second user,
wherein providing the content includes presenting an image representation of the first user in the second virtual reality space so as to present the content and the image of the first user interacting with the content from a perspective of the second user; and
in response to detecting the signal accepting the request to share, updating the content presented in the virtual reality space of the first user to include an image representation of the second user interacting with the content so as to present the content and the image of the second user from a perspective of the first user and wherein the content rendered in the virtual reality space and the second virtual reality space is synchronized in substantial real time,
wherein method operations are performed by one or more processors of a server computer.

2. The method of claim 1, wherein the request to share is initiated by the first user and extended to the second user.

3. The method of claim 1, wherein the request to share is initiated by the second user to the first user.

4. The method of claim 3, wherein the first user is identified from social contacts of the second user.

5. The method of claim 1, wherein targeting the second user includes,
retrieving social contacts of the first user from one or more social networks associated with the first user in response to detection of the request to share, the social contacts presented at the head mounted display for selection; and
receiving selection of the second user from the social contacts.

6. The method of claim 1, further includes providing access to the content rendered in the head mounted displays of the first and the second user, the access allowing the first user and the second user to interact with the application, the interaction used as input to dynamically affect an outcome of the application, such that the virtual environment scene presented at the head mounted display of the first and the second users is adjusted in substantial real time to reflect the outcome.

7. The method of claim 1, further includes,
identifying one or more real world objects from a real world scene within a vicinity of the first user and the second user;
coordinating positions of the real world objects to specific objects or positions in the virtual environment scene; and
translating actions taken related to the real world objects into actions to be taken by the application in the virtual environment scene, the actions used to dynamically adjust content of the virtual environment scene presented on the head mounted display of the first and the second users.

8. The method of claim 7, wherein coordinating positions further includes,
tracking the positions of the real world objects using one or more cameras; and
synchronizing the positions of the real world objects with the specific objects or positions in the virtual environment scene.

9. The method of claim 1, further includes presenting other user-related information associated with the second user within the virtual reality space of the first user and other user-related information associated with the first user within the virtual reality space of the second user.

10. The method of claim 9, wherein presenting the other user-related information includes bringing the user-related information of the first and the second users gradually into focus within the respective virtual reality spaces.

11. The method of claim 1, further includes,
generating a signal to pause an activity that the second user was involved in prior to detection of the signal granting the request to share, the activity providing second content for rendering at the head mounted display of the second user, wherein the second content is different from the content rendered at the head mounted display of the first user; and
presenting the content from the virtual environment scene of the first user.

12. The method of claim 11, further includes,
detecting a request to leave the virtual reality space of the first user, the request to leave initiated by the second user;
in response to the request to leave, ceasing rendering of content from the virtual reality space of the first user on the display screen of the head mounted display of the second user; and
resuming the activity that the second user was involved in from a point where it was paused, the resuming causes rendering of the second content on the display screen of the head mounted display of the second user.

13. The method of claim 12, wherein the request to leave further includes removing user-related information of the second user including the image representation of the second user from the virtual reality space of the first user, the removal is by gradually fading out the user-related information and the image representation of the second user from the virtual reality space of the first user.

14. The method of claim 1, further includes,
detecting a request to leave the virtual reality space, the request initiated by the first user; and
in response to the request to leave, ceasing the rendering of the content in the virtual reality space of the first user and the second user.

15. The method of claim 14, wherein ceasing further includes,
providing a portion of the application to the second user to allow the second user to continue interacting with the application, the portion of the application providing content for rendering on the head mounted display of the second user,
wherein the portion is one of an abridged version of the application, a portion that is less than whole application or the application with less features.

16. A method, comprising:
receiving a request for a virtual tour of a geo location, from a first user;
returning video content associated with the virtual tour for presenting in virtual reality space defined on a display screen of a head mounted display associated with the first user, in response to the request, the video content being presented in three dimensional space;
detecting an invitation to share the virtual tour of the geo location, wherein the invitation is extended by the first user to a second user;
providing the video content from the virtual reality space of the first user to the second user, upon the second user accepting the invitation, the acceptance to join causes the video content associated with the virtual tour of the geo location to be rendered on the display screen of the head mounted display of the second user, wherein the video content provided to the second user includes an image representation of the first user interacting with the video content from a perspective of the second user; and updating the video content rendered in the virtual reality space of the first user to include an image representation of the second user interacting with the video content, upon the second user accepting the invitation, the image representation of the second user presented from a perspective of the first user, wherein method operations are performed by one or more processors of a server computer.

17. The method of claim 16, wherein the video content presented in the virtual reality space includes one or more user-related information of other users taking the virtual tour of the geo location at a time the request was received, wherein the user-related information includes image representations of the other users interacting with the video content.

18. The method of claim 17, wherein extending the invitation further includes, retrieving social contacts of the first user by querying one or more social network of the first user, the social contacts presented to the first user on the display screen for selection;

detecting selection of the second user from the social contacts of the first user, the second user being different from the other users whose user-related information is rendered in the virtual reality space.

19. The method of claim 16, wherein the virtual reality space includes one or more user-related information of other users that have accepted the invitation to join the virtual tour.

20. The method of claim 16, wherein the video content presented in the virtual tour for the geo location includes content pre-recorded by the first user or one of other users and made available for sharing.

21. The method of claim 16, wherein the video content presented in the virtual tour for the geo location is being captured by the first user and transmitted to the second user in substantial real time, in response to the second user accepting the invitation to join.

22. The method of claim 16, wherein sharing the virtual reality space further includes, generating a signal to pause an activity that the second user was involved in prior to accepting the invitation;

identifying a restart point for resuming the activity;

stopping the content associated with the activity from rendering at the head mounted display of the second user and providing the video content presented in the virtual reality space of the first user for rendering at the virtual reality space of the second user; and inserting user-related information of the second user into the virtual reality space shared by the first user.

23. The method of claim 22, further includes, detecting a request to leave the virtual tour, the request to leave initiated by the second user;

stopping the rendering of video content of the virtual tour on the display screen of the head mounted display of the second user, in response to detecting the request to leave the virtual tour;

removing the user-related information of the second user from the virtual reality space shared with the first user; and resuming the activity that the second user was involved in prior to joining the virtual tour, the activity being resumed from the restart point.

24. A method, comprising:

identifying a first virtual reality space of a first user wearing a first head mounted display, the first virtual reality space defined on a display screen of the first head mounted display that is used to present content from a first application;

identifying a second virtual reality space of a second user wearing a second head mounted display, the second virtual reality space defined on the display screen of the second head mounted display used to present content from a second application, wherein the content presented in the first virtual reality space is different from the content presented in the second virtual reality space;

detecting an invitation to join the first virtual reality space of the first user, the invitation being extended by the first user to the second user; and sharing the content from the first virtual reality space of the first user with the second user, upon the second user accepting the invitation, wherein the content provided to the second user is updated to include an image representation of the first user interacting with the content from a perspective of the second user and wherein the content presented in the first virtual reality space of the first user is updated to include an image representation of the second user interacting with the content from a perspective of the first user, the sharing causes synchronization of the content rendered in the first virtual reality space and the second virtual reality space, wherein method operations are performed by one or more processors of a server computer.

25. The method of claim 24, wherein the detecting further includes, retrieving social contacts of the first user by querying one or more social network associated with the first user, the social contacts presented to the first user on the display screen of the first head mounted display for selection;

detecting selection of the second user from the social contacts of the first user presented on the display screen of the first head mounted display, for extending the invitation to join.

26. The method of claim 24, wherein sharing includes, generating a signal to pause execution of the second application, the pausing identifying a restart point for resuming the second application; and ceasing rendering of the content from the second application in the second virtual reality space and begin rendering the content of the first application presented in the first virtual reality space.

27. The method of claim 26, wherein when the first user elects to leave the first application, stop rendering the content of the first application in the first and the second virtual reality spaces.

28. The method of claim 27, further includes, receiving interaction from the second user with a portion of the first application presented in the second virtual reality space, the content presented in the first and the second virtual reality spaces being dynamically adjusted in response to the interaction.

29. The method of claim 26, further includes, when the first user elects to leave the first application, stop rendering the content of the first application in the second virtual reality space; and resume execution of the second application from the restart point, the resumption of the second application resulting in the rendering of the content from the second application in the second virtual reality space.

30. The method of claim 24, wherein when the first or the second user moves, the content presented in the first and the second virtual reality spaces are dynamically adjusted to coordinate with a new location or new direction that correlates with the movement of the first or the second user.

31. A method, comprising:

providing content of a virtual environment scene for rendering on a display screen of a head mounted display associated with a first user, the content for the virtual environment scene being provided by an application, the display screen defining a first virtual reality space of the first user;

detecting a request from a second user to the first user requesting to join the first virtual reality space of the first user to view the content;

detecting acceptance of the request from the first user; and transitioning the second user to the first virtual reality space of the first user by providing the content for rendering on the display screen of the head mounted display of the second user, in response to detecting the acceptance of the request to share, the content being rendered in a second virtual reality space defined on the head mounted display associated with the second user, wherein the content provided for presenting in the second virtual reality space is updated to include an image representation of the first user interacting with the content from a perspective of the second user and content presented in the first virtual reality space being updated to include an image representation of the second user interacting with the content from a perspective of the first user, wherein the content rendered in the second virtual reality space is synchronized in substantial real time with content rendered in the first virtual reality space, wherein method operations are performed by one or more processors of a server computer.

* * * * *